US008615431B1

(12) United States Patent
Bell et al.

(10) Patent No.: US 8,615,431 B1
(45) Date of Patent: Dec. 24, 2013

(54) NETWORK CONTENT MESSAGE PLACEMENT MANAGEMENT

(75) Inventors: Charles H. Bell, Redmond, WA (US); Jonathan A. Jenkins, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 7 days.

(21) Appl. No.: 13/249,047

(22) Filed: Sep. 29, 2011

(51) Int. Cl.
*G06Q 30/00* (2012.01)
*G06F 17/00* (2006.01)

(52) U.S. Cl.
USPC ...................................... 705/14.48; 705/400

(58) Field of Classification Search
USPC .............................. 705/14.48, 400
See application file for complete search history.

(56) References Cited

U.S. PATENT DOCUMENTS

| | | | |
|---|---|---|---|
| 5,634,064 A | 5/1997 | Warnock et al. |
| 5,872,850 A | 2/1999 | Klein et al. |
| 5,961,593 A | 10/1999 | Gabber et al. |
| 6,049,812 A | 4/2000 | Bertram et al. |
| 6,108,637 A | 8/2000 | Blumenau |
| 6,138,156 A | 10/2000 | Fletcher et al. |
| 6,195,679 B1 | 2/2001 | Bauersfeld et al. |
| 6,430,624 B1 | 8/2002 | Jamtgaard et al. |
| 6,549,941 B1 | 4/2003 | Jaquith et al. |
| 6,560,620 B1 | 5/2003 | Ching |
| 6,625,624 B1 | 9/2003 | Chen et al. |
| 6,704,024 B2 | 3/2004 | Robotham et al. |
| 6,785,864 B1 | 8/2004 | Te et al. |
| 6,871,236 B2 | 3/2005 | Fishman et al. |
| 6,944,665 B2 | 9/2005 | Brown et al. |
| 6,963,850 B1 | 11/2005 | Bezos et al. |
| 7,003,442 B1 | 2/2006 | Tsuda |
| 7,051,084 B1 | 5/2006 | Hayton et al. |
| 7,054,952 B1 | 5/2006 | Schwerdtfeger et al. |
| 7,085,736 B2 | 8/2006 | Keezer et al. |
| 7,159,023 B2 | 1/2007 | Tufts |
| 7,171,478 B2 | 1/2007 | Lueckhoff et al. |
| 7,191,211 B2 | 3/2007 | Tuli |
| 7,353,252 B1 | 4/2008 | Yang et al. |

(Continued)

FOREIGN PATENT DOCUMENTS

WO    WO 2013/003631 A2    1/2013

OTHER PUBLICATIONS

Baumann, A., et al., Enhancing Stem Classes Using Weave: A Collaborative Web-Based Visualization Environment, Integrated Stem Education Conference, Apr. 2, 2011, Ewing, New Jersey, pp. 2A-1-2A-4.

(Continued)

*Primary Examiner* — John G Weiss
*Assistant Examiner* — Dipen Patel
(74) *Attorney, Agent, or Firm* — Knobbe, Martens, Olson & Bear, LLP

(57) ABSTRACT

A network content message placement management process is directed to the processing and management of messages in content displayed at a client computing device. A client computing device provides message placement configuration information to a network computing and storage provider. The network computing and storage transmits message placement requests to a content provider based on the message placement configuration information. The client computing device may subsequently directly or indirectly request content from the content provider. The content provided from the content provider may include one or more of the alternative messages provided in the message placement configuration information. Illustratively, the alternative messages may be included in place of other messages, such as advertisements, from third party message providers.

29 Claims, 17 Drawing Sheets

(56) References Cited

U.S. PATENT DOCUMENTS

| | | | |
|---|---|---|---|
| 7,373,313 B1 | 5/2008 | Kahle et al. | |
| 7,543,059 B2 | 6/2009 | Johnson et al. | |
| 7,792,944 B2 | 9/2010 | DeSantis et al. | |
| 7,831,582 B1 | 11/2010 | Scofield et al. | |
| 7,975,000 B2 | 7/2011 | Dixon et al. | |
| 7,996,912 B2 | 8/2011 | Spalink et al. | |
| 8,010,545 B2 | 8/2011 | Stefik et al. | |
| 8,015,496 B1 | 9/2011 | Rogers | |
| 8,060,463 B1 | 11/2011 | Spiegel | |
| 8,073,850 B1 | 12/2011 | Hubbard et al. | |
| 8,103,742 B1 | 1/2012 | Green | |
| 8,185,621 B2 | 5/2012 | Kasha | |
| 8,249,904 B1 | 8/2012 | DeSantis et al. | |
| 8,271,887 B2 | 9/2012 | Offer et al. | |
| 8,316,124 B1 | 11/2012 | Baumback et al. | |
| 8,336,049 B2 | 12/2012 | Medovich | |
| 2001/0039490 A1 | 11/2001 | Verbitsky et al. | |
| 2002/0030703 A1 | 3/2002 | Robertson et al. | |
| 2002/0194302 A1 | 12/2002 | Blumberg | |
| 2003/0023712 A1 | 1/2003 | Zhao et al. | |
| 2003/0041106 A1 | 2/2003 | Tuli | |
| 2004/0083294 A1 | 4/2004 | Lewis | |
| 2004/0139208 A1 | 7/2004 | Tuli | |
| 2004/0181613 A1 | 9/2004 | Hashimoto et al. | |
| 2004/0205448 A1 | 10/2004 | Grefenstette et al. | |
| 2004/0220905 A1 | 11/2004 | Chen et al. | |
| 2004/0243622 A1 | 12/2004 | Morisawa | |
| 2005/0010863 A1 | 1/2005 | Zernik | |
| 2005/0060643 A1 | 3/2005 | Glass et al. | |
| 2005/0138382 A1 | 6/2005 | Hougaard et al. | |
| 2005/0183039 A1 | 8/2005 | Revis | |
| 2005/0246193 A1 | 11/2005 | Roever et al. | |
| 2006/0085766 A1 | 4/2006 | Dominowska et al. | |
| 2006/0095336 A1* | 5/2006 | Heckerman et al. | 705/26 |
| 2006/0122889 A1* | 6/2006 | Burdick et al. | 705/26 |
| 2006/0168510 A1 | 7/2006 | Bryar et al. | |
| 2006/0184421 A1* | 8/2006 | Lipsky et al. | 705/14 |
| 2006/0248442 A1 | 11/2006 | Rosenstein et al. | |
| 2006/0277167 A1 | 12/2006 | Gross et al. | |
| 2006/0294461 A1 | 12/2006 | Nadamoto et al. | |
| 2007/0022072 A1 | 1/2007 | Kao et al. | |
| 2007/0027672 A1 | 2/2007 | Decary et al. | |
| 2007/0094241 A1 | 4/2007 | Blackwell et al. | |
| 2007/0124693 A1 | 5/2007 | Dominowska et al. | |
| 2007/0139430 A1 | 6/2007 | Korn et al. | |
| 2007/0240160 A1 | 10/2007 | Paterson-Jones et al. | |
| 2007/0288589 A1 | 12/2007 | Chen et al. | |
| 2008/0028334 A1 | 1/2008 | De Mes | |
| 2008/0104502 A1 | 5/2008 | Olston | |
| 2008/0183672 A1 | 7/2008 | Canon et al. | |
| 2008/0184128 A1 | 7/2008 | Swenson et al. | |
| 2008/0320225 A1 | 12/2008 | Panzer et al. | |
| 2009/0012969 A1 | 1/2009 | Rail et al. | |
| 2009/0164924 A1 | 6/2009 | Flake et al. | |
| 2009/0204478 A1 | 8/2009 | Kaib et al. | |
| 2009/0217199 A1 | 8/2009 | Hara et al. | |
| 2009/0248680 A1 | 10/2009 | Kalavade | |
| 2009/0254867 A1 | 10/2009 | Farouki et al. | |
| 2009/0282021 A1 | 11/2009 | Bennett | |
| 2009/0287698 A1 | 11/2009 | Marmaros et al. | |
| 2009/0327914 A1 | 12/2009 | Adar et al. | |
| 2010/0036740 A1* | 2/2010 | Barashi | 705/14.71 |
| 2010/0057639 A1* | 3/2010 | Schwarz et al. | 705/400 |
| 2010/0125507 A1 | 5/2010 | Tarantino, III et al. | |
| 2010/0131594 A1 | 5/2010 | Kashimoto | |
| 2010/0138293 A1 | 6/2010 | Ramer et al. | |
| 2010/0218106 A1 | 8/2010 | Chen et al. | |
| 2010/0293190 A1 | 11/2010 | Kaiser et al. | |
| 2010/0312788 A1 | 12/2010 | Bailey | |
| 2010/0318892 A1 | 12/2010 | Teevan et al. | |
| 2010/0332513 A1 | 12/2010 | Azar et al. | |
| 2011/0022957 A1 | 1/2011 | Lee | |
| 2011/0029854 A1 | 2/2011 | Nashi et al. | |
| 2011/0055203 A1 | 3/2011 | Gutt et al. | |
| 2011/0078140 A1 | 3/2011 | Dube et al. | |
| 2011/0078705 A1 | 3/2011 | Maclinovsky et al. | |
| 2011/0119661 A1 | 5/2011 | Agrawal et al. | |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0191327 A1 | 8/2011 | Lee | |
| 2011/0197121 A1 | 8/2011 | Kletter | |
| 2011/0246873 A1 | 10/2011 | Tolle et al. | |
| 2011/0289074 A1 | 11/2011 | Leban | |
| 2011/0296341 A1 | 12/2011 | Koppert | |
| 2011/0302510 A1 | 12/2011 | Harrison et al. | |
| 2012/0072821 A1 | 3/2012 | Bowling | |
| 2012/0084644 A1 | 4/2012 | Robert et al. | |
| 2012/0096365 A1 | 4/2012 | Wilkinson et al. | |
| 2012/0110017 A1 | 5/2012 | Gu et al. | |
| 2012/0137201 A1 | 5/2012 | White et al. | |
| 2012/0143944 A1 | 6/2012 | Reeves et al. | |
| 2012/0150844 A1 | 6/2012 | Lindahl et al. | |
| 2012/0166922 A1 | 6/2012 | Rolles | |
| 2012/0192220 A1* | 7/2012 | Wyatt et al. | 725/30 |
| 2012/0198516 A1 | 8/2012 | Lim | |
| 2012/0215834 A1 | 8/2012 | Chen et al. | |
| 2012/0215919 A1 | 8/2012 | Labat et al. | |
| 2012/0284629 A1 | 11/2012 | Peters et al. | |
| 2012/0317295 A1 | 12/2012 | Baird et al. | |
| 2012/0331406 A1 | 12/2012 | Baird et al. | |
| 2013/0007101 A1 | 1/2013 | Trahan et al. | |
| 2013/0007102 A1 | 1/2013 | Trahan et al. | |
| 2013/0031461 A1 | 1/2013 | Hou et al. | |
| 2013/0080611 A1 | 3/2013 | Li et al. | |

OTHER PUBLICATIONS

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

Chen, H., et al., "Bringing Order to the Web: Automatically Categorizing Search Results," Proceedings of the SIGCHI Conference on Human Factors in Computing Systems, Apr. 1-6, 2000, pp. 145-152.

Bango, Rey, "How JS & Ajax work in Opera Mini 4", Nov. 2, 2007, XP055050107, Retrieved from the Internet.

Brinkmann, M., "Record and Share your browser history with Hooeey," ghacks.net, Feb. 26, 2008, 6 pages, printed on Jan. 25, 2013.

Considine, A., "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber, et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/TECH/computing/9910/18/r.u.sure/index.html, 3 pages.

Van Kleek, M., Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

(56) References Cited

OTHER PUBLICATIONS

Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

Rao, H.C.-H., et al., "A Proxy-Based Personal Web Archiving Service," Operating Systems Review, 35(1):61-72, 2001.

Teevan, J., et al., "Changing How People View Changes on the Web," 2009, Proceedings of the $22^{nd}$ Annual ACM Symposium on User Interface Software and Technology, New York, 2009, pp. 237-246.

\* cited by examiner

NETWORK CONTENT MESSAGE PLACEMENT MANAGEMENT

BACKGROUND

Generally described, computing devices and communication networks can be utilized to exchange information. In a common application, a computing device can request content from another computing device via the communication network. For example, a user at a computing device, such as a personal computer, can utilize a software browser application, typically referred to as a browser, to request a Web page from a server computing device via the Internet. In such embodiments, the requesting computing device can be referred to as a client computing device and the server computing device can be referred to as a content provider. Generally, the user may request, obtain, and interact with a number of requested Web pages or other content simultaneously, or in sequence, through the software browser application. The collection of content accessed by a client computing device via the software browser application over a period of time may be referred to as a browse session.

Content accessed by a browsing software application, such as Web pages, typically include a number of parts, which can include text, images, videos, etc. Often the collection of parts are integrated to provide a specific look and feel to the Web page. Because content providers typically incur significant expenses in the presentation of content, content providers often include advertising messages as part the content provided to the client computing device. Such advertising messages may either be for the benefit of an advertiser other than the content provider, or may promote products or services sold by the content provider. For example, a shopping Web site may include on its Web pages for advertisements products or services sold by the shopping Web site to promote additional sales. In another example, a content provider may utilize an third party service that provides the content provider financial compensation based on the number of advertisements displayed to users or in the event that a displayed advertisement results in desired interaction with users (e.g., a purchase of an advertised product).

It is common for a content provider to reserve a number of areas, or "slots," in a Web page for displaying advertising message when the content is displayed at the client computing device. Additionally, a content provider or third-party advertising provider may select from a number of eligible advertising messages to include in the display of the content. In many cases, third parties who wish to advertise through a content provider may purchase placements for their advertising messages in one or more slots of content provided by the content provider. The purchase of an advertising message is often based on a bidding paradigm in which the advertisement associated with a highest bidder is selected.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
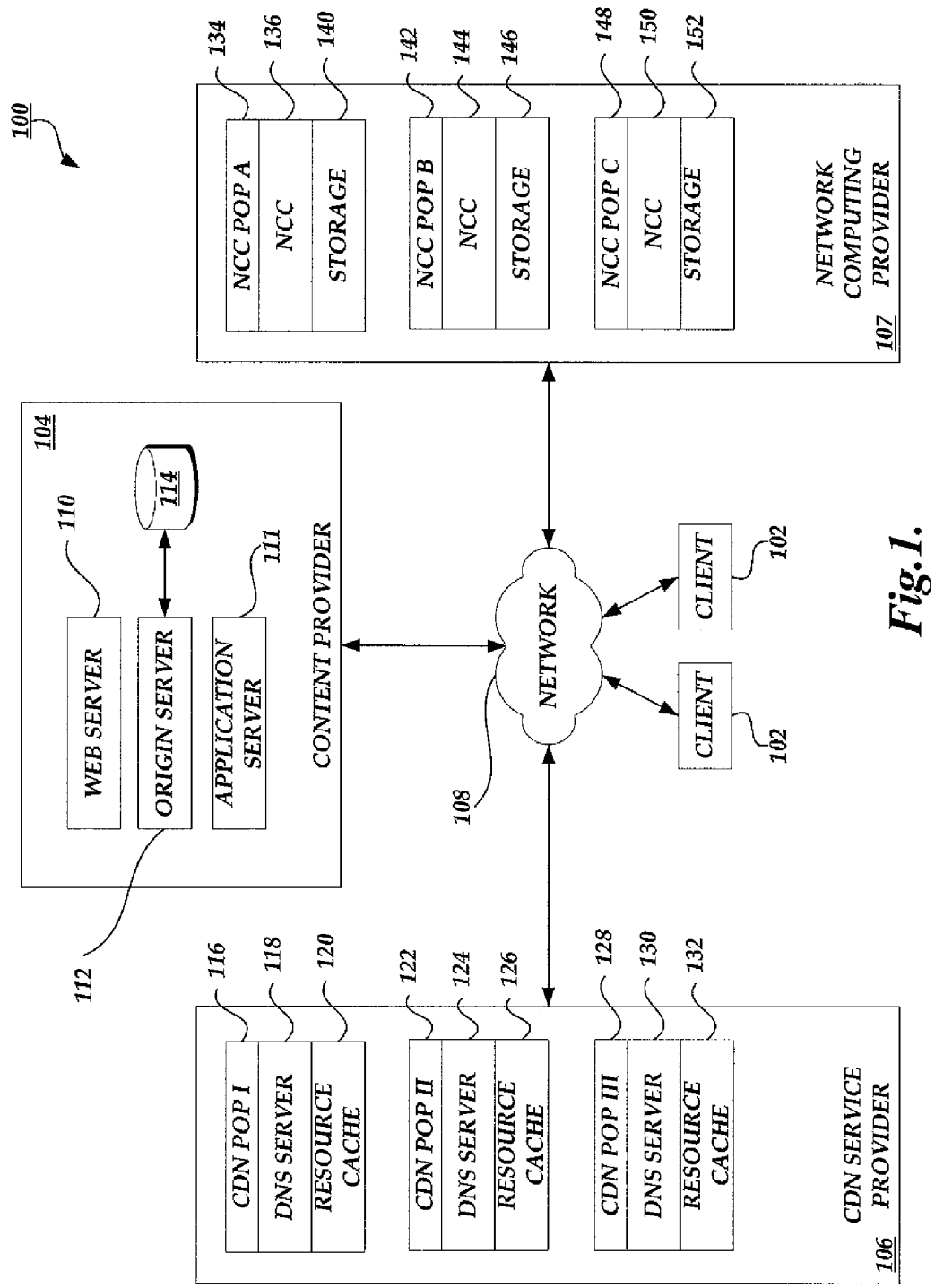
FIG. 1 is a block diagram illustrative of a content delivery environment including a number of client computing devices, content provider, a content delivery network service provider, and a network computing provider.

Generally described, aspects of the present disclosure is directed to the placement and management of alternative messages in network content displayed at a client computing device in conjunction with content providers and a network computing provider. Specifically, aspects of the disclosure will be described with regard to the transmission of network resources and selected message information between the client computing device, a network computing provider, and a content provider based on placement configuration information.

Although various aspects of the disclosure will be described with regard to illustrative examples and embodiments, one skilled in the art will appreciate that the disclosed embodiments and examples should not be construed as limiting. More specifically, while aspects of the present disclosure will be described with regard to the placement of alternative messages in the context of network content, the present disclosure (or portions thereof) may be applicable in alternative environments such as the presentation of digital audio or video content, published media, and the like. Further, although a network computing provider is described herein for purposes of illustration as obtaining message placement configuration information and providing message placement requests to a content provider, it should be understood that any number of different entities and/or devices may perform any functionality or combination of functionalities as described herein. Accordingly, the scope of the disclosure should be understood as not limited to any specific combination of actors or steps.

With reference to an illustrative example, a user may cause a client computing device to instantiate a software browser application (henceforth referred to as a "browser") for accessing content (e.g., a Web page) provided by one or more content providers. In one embodiment, the client computing device generates message placement configuration information. associated with the placement of alternative messages in content displayed in the software browser application. Illustratively, the message placement configuration information may include or reference one or more alternative messages or references to alternative messages for display in accessed content. The message placement configuration information may further include preference information associated with the placement of the alternative messages. For example, assume a user accesses an interface provided by a network computing provider and selects one or more images of his family stored on the client computing device to use as alternative messages. The user may further enter financial payment information and authorize an amount of money to be utilized to ensure the alternative message placement on an ongoing periodic basis (e.g., weekly). The user may still further enter preference information such as purchasing goals for the alternative message placement.

Subsequent to receiving the message placement configuration information, the network computing provider may process the message placement configuration information to generate one or more message placement requests. In one embodiment, the message placement requests may correspond to bidding requests associated with a bidding process for the purchase of messages at a content provider or other message placement provider (e.g., a third-party advertising placement provider). Illustratively, the network computing provider may generate message placement requests corresponding to slots and/or placements in content most likely to satisfy the preference information included in the message placement configuration information. The message placement requests may further include the alternative messages identified by the user. Illustratively, the alternative messages may themselves be provided in the message placement requests, or may be included as references or identifiers to messages stored elsewhere. For example, the message placement requests may include references such as Uniform Resource Locators ("URLs") identifying alternative messages such as images, video clips, animations, or text stored at the network computing provider or other network data store.

The content provider or other message placement provider may receive and process the message placement requests. Subsequent to the message placement provider receiving and processing the message placement requests, the client computing device may request network content from the content provider. In one embodiment, responsive to the message placement requests, the content provider may provide the requested content to the client computing device with one or more of the alternative messages specified by the message placement requests included in respective slots in the requested content. For the purposes of a specific example, a user may request a Web page through a browser at a client computing device. The content provider may select messages, such as advertisements, to place in various message slots in the Web page based on bids from any number of advertisers and bids provided in message placement requests from the network computing provider on the behalf of the user, as described above. Illustratively, the content provider may select the highest bids for messages for each slot in the requested Web page. For the purposes of the example, we may assume that the bids provided in the message placement requests from the network computing provider are the highest bids for several of the slots in the requested Web page. Accordingly, the content provider may provide the Web page to the client computing device with the alternative messages (e.g., pictures of the user's family) in one or more slots on the Web page. Thus the alternative messages may be included in one or more slots on the Web page in lieu of an advertisement or other third-party content. In various embodiments, this may allow a user to substitute one or more selected alternative messages for in place of advertisements in the viewed content.

In another embodiment, the network computing provider may act as a remote browse session host or other intermediary in the process of obtaining and processing content requested by the client computing device. For example, in an illustrative embodiment, responsive to a request received from the client computing device, the network computing provider may instantiate or cause to have instantiated one or more computing components associated with a remote browse session corresponding to requested content. The network computing provider may analyze the request for content and/or obtain and analyze the requested content itself in determining what message placement requests to generate based on the message placement configuration information.

For the purposes of a specific example, the network computing provider may determine that a particular network resource, such as a Web page, associated with the request for content has a certain number and configuration of message slots, and may further determine that the network resource is provided by a first content provider who displays advertising obtained from a first advertising placement provider. Accordingly, the network computing provider may generate one or more message placement requests specific to the first advertising placement provider based on the analysis of the Web page and message placement configuration information provided by the user at the client computing device. The network computing provider may transmit the one or more message placement requests to the first advertising placement provider simultaneous, prior, or subsequent to a request to the content provider for the network resource. Based on the message placement requests sent to the first advertising placement provider, the Web page may be provided to the network computing provider with one or more alternative messages included in one or more message slots. The network computing provider may accordingly provide a representation of the Web page to the client computing device for display. In some embodiments, the network computing provider may further replace one or more advertisements or other information in slots in the Web page with one or more alternative messages before providing the representation of the Web page to the client computing device.

With regard to embodiments illustrating the processing and maintenance of a remote session at the network computing provider, the network computing provider may instantiate any number of network computing components in response to a request for a remote browse session obtained from a client computing device. Using the instantiated network computing components, the network computing provider may request any identified network resource(s) identified in the remote browse session request from one or more content providers, a content delivery network, or a local or associated cache component. For example, the browser software application on the instantiated network computing component can process a primary network resource and then generate additional content requests for content identified in one or more embedded resource identifiers (e.g. pictures, video files, etc.). Illustratively, in the case of other, non-browser, applications, network resources or content may include any file type or format known in the art and supported by the specific software application. Illustratively, in some situations, one or more devices associated with the network computing provider may be located in a data center or other robustly networked computing environment, and, as compared to the client computing device, may experience relatively little latency or delay when obtaining network resources.

Having obtained the requested content (e.g., the requested network resource and embedded resources), the network computing provider may identify a remote session browsing configuration specifying a remote session communication protocol for use in transmitting the requested content, user interaction data, intermediate processing results, and other information between the browser being executed on the client computing device and the browser being executed at the instantiated network computing component on the network computing provider. The information exchanged between the browser on the instantiated network computing component and the browser on the client computing device can be generally referred to as "browser session information."

In addition to specifying a remote session communication protocol for transmitting information between the client computing device and the instantiated network computing component, in one embodiment, the identified remote session browsing configuration may specify that one or more processing actions to be performed on the requested content are to be performed at the network computing provider rather than, or in addition to, at the client computing device For purposes of illustration, the processing of network content by a browser may involve various processing actions before content can be rendered in an appropriate form on a client computing device. A Web page, for example, may be parsed and processed to process various HTML layout information and references to associated resources or embedded content such as CSS style sheets and JavaScript, as well as embedded content objects such as images, video, audio, etc. Each object or piece of code may be parsed and processed before a representative object model corresponding to the web page may be constructed and processed further for layout and display. In accordance with the selected remote session browsing configuration, the client computing device and the instantiated network computing component may exchange processing results via browser session information (e.g., state data or display data representing the requested content).

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

In various embodiments, the content provider 104 may manage the placement, processing, and/or purchasing of messages (e.g., advertisements) in content provided by the content provider 104. For example, the content provider 104 may accept bids, subscriptions, purchasing agreements, etc. with one or more third-party advertisers for the placement of messages in content. In other embodiments, one or more of the functions described here may be performed by a third-party message placement provider (e.g., an advertisement placement provider not shown) with an agreement or other relationship to provide and/or manage messages for the content provider. For example, in various embodiments, the third-party message service provider may provide the content provider 104 with messages, tags, or references to messages provided by the third-party message service provider to provide in content served by the content provider 104. In other embodiments, the content provider 104 may serve content with one or more software instructions or tags instructing a browser or content provider 104 to retrieve messages selected by the third-party message service provider. Accordingly, any function or combination of functionality described herein as performed by a content provider 104 may in various other embodiments be performed by a third-party entity or service such as a third-party message placement provider or CDN service provider 106.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing provider 107 in communication with the one or more client computing devices 102, the CDN service provider 106, and the content provider 104 via the communication network 108. The network computing provider 107 illustrated in FIG. 1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1 as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

In various embodiments, the network computing provider 107 may manage the placement, processing, and/or purchasing of messages (e.g., advertisements) in content provided by the content provider 104. For example, the network computing provider 107 may obtain message placement configuration information from a client computing device 102, and may generate message placement requests for a content provider 104 or other message placement provider. In one embodiment, one or more of the functions described here may be performed by a message management component at the client computing device 102 or associated with any other third-party. In other embodiments, one or more of the functions described here may be performed by a third-party message placement provider (e.g., an advertisement placement provider) with an agreement or other relationship to provide and/or manage messages for the content provider. Accordingly, any function or combination of functionality described herein as performed by a network computing provider 107 may in various other embodiments be performed by a third-party entity or service such as a client computing device 102, a third-party message placement provider, a content provider 104, or CDN service provider 106, among others.

With regard to FIGS. 2-11, illustrative interactions, user interfaces, and routines will be described for the generation, processing, and maintenance of a remote browsing session at a network computing provider. Illustrative further discussion of message selection, processing, and maintenance will be described in greater detail with reference to FIGS. 12-17 below.

With reference now to FIGS. 2-6, the interaction between various components of the networked computing environment 100 of FIG. 1 will be illustrated. Specifically, FIGS. 2-6 illustrate the interaction between various components of the networked computing environment 100 for the exchange of content between a client computing device 102 and a content provider 104 via the network computing provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
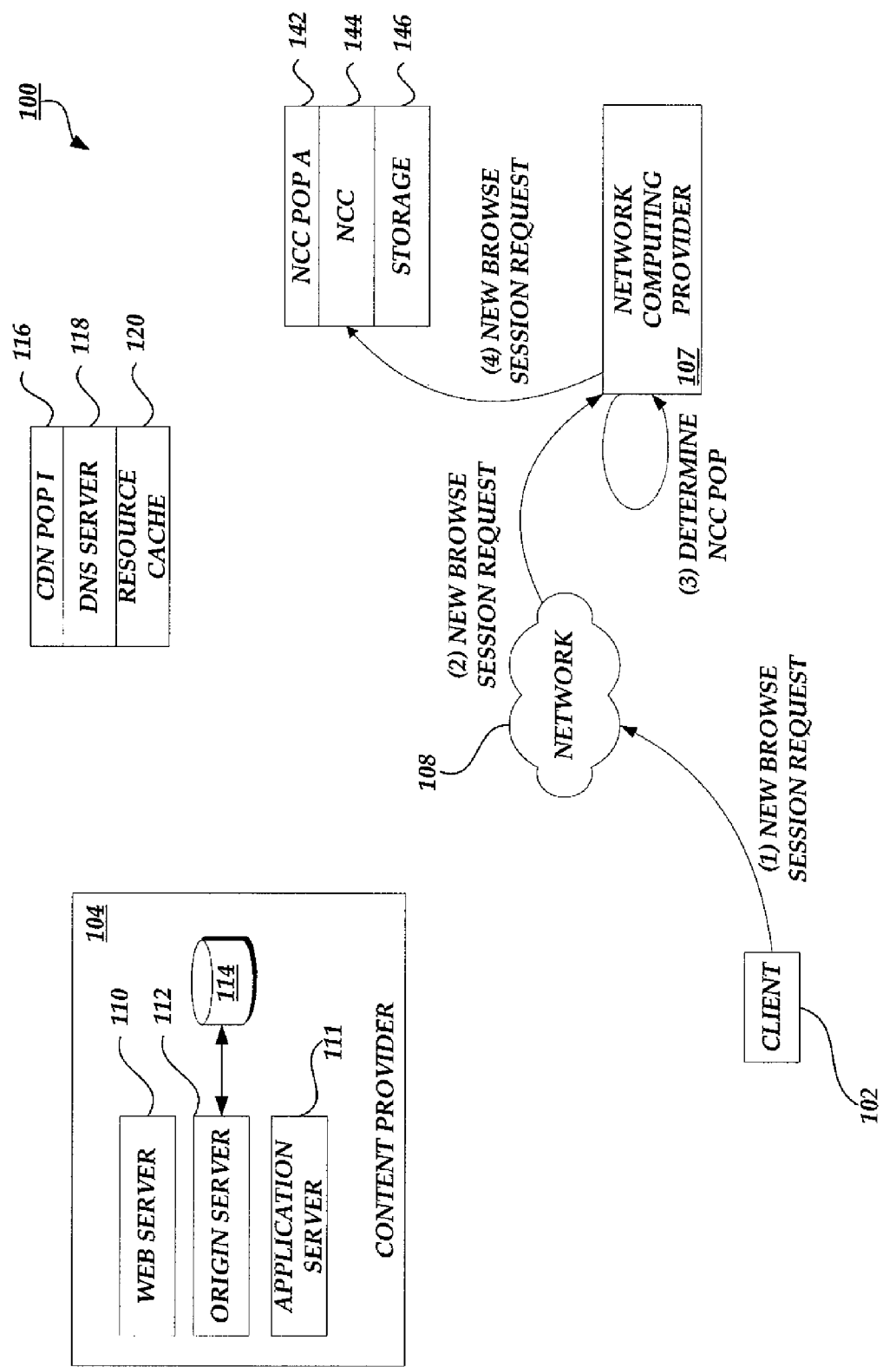
FIG. 2 is a block diagram of the content delivery environment of FIG. 1 illustrating the generation and processing of a new browse session request from a client computing device to a network computing provider.

With reference to FIG. 2, the process can begin with the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
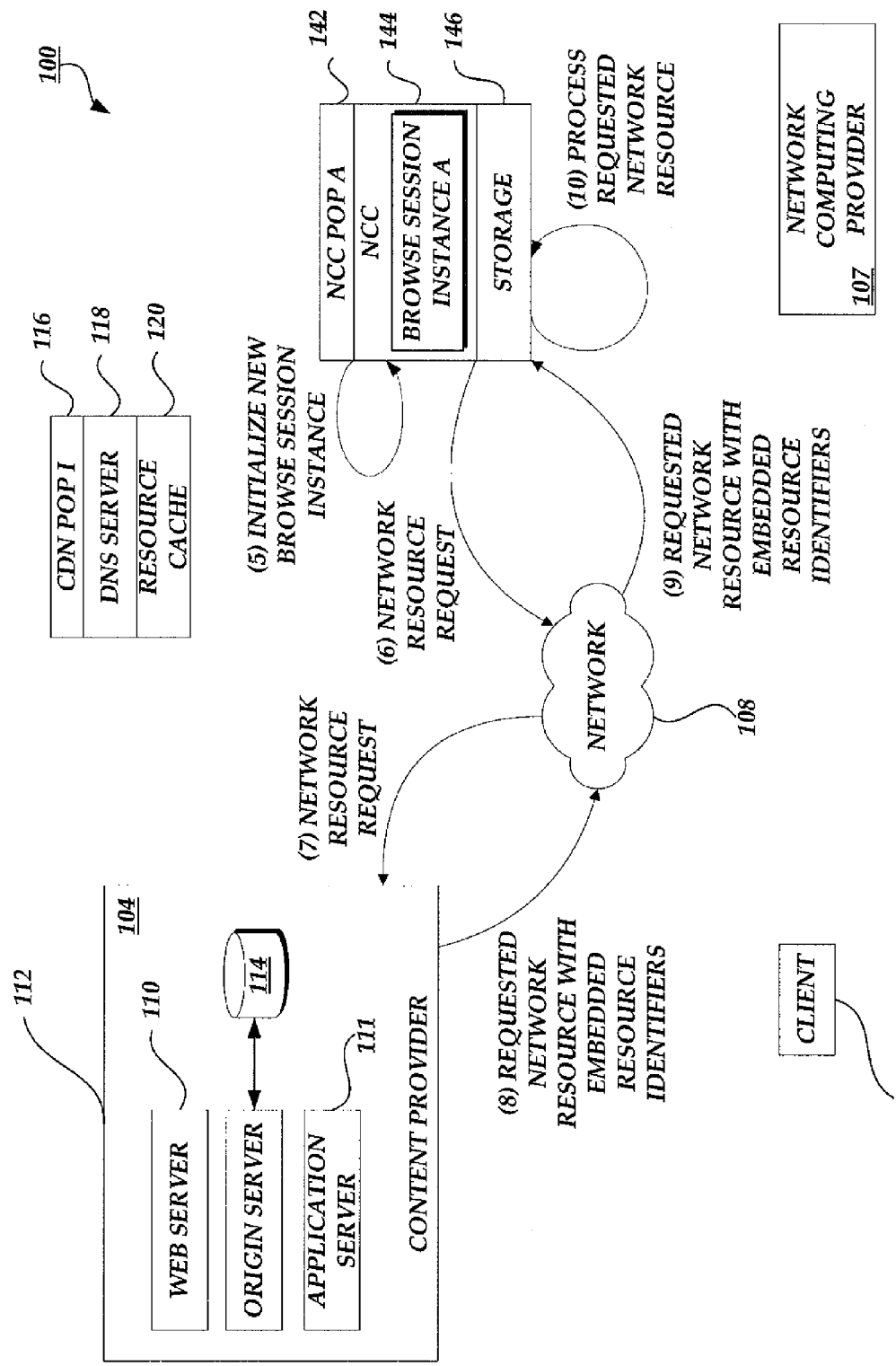
FIG. 3 is a block diagram of the content delivery environment of FIG. 1 illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third-party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and JavaScript as well as embedded resource identifiers to additional resources such as text, images, video, audio, animation, executable code, and other HTML, CSS, and JavaScript files. In the process of extracting the embedded resource identifiers, the NCC POP 142 may gather information about the processed network resources for later use in the determination of a remote session browsing configuration as discussed below with reference to FIG. 4.

Figure 4:
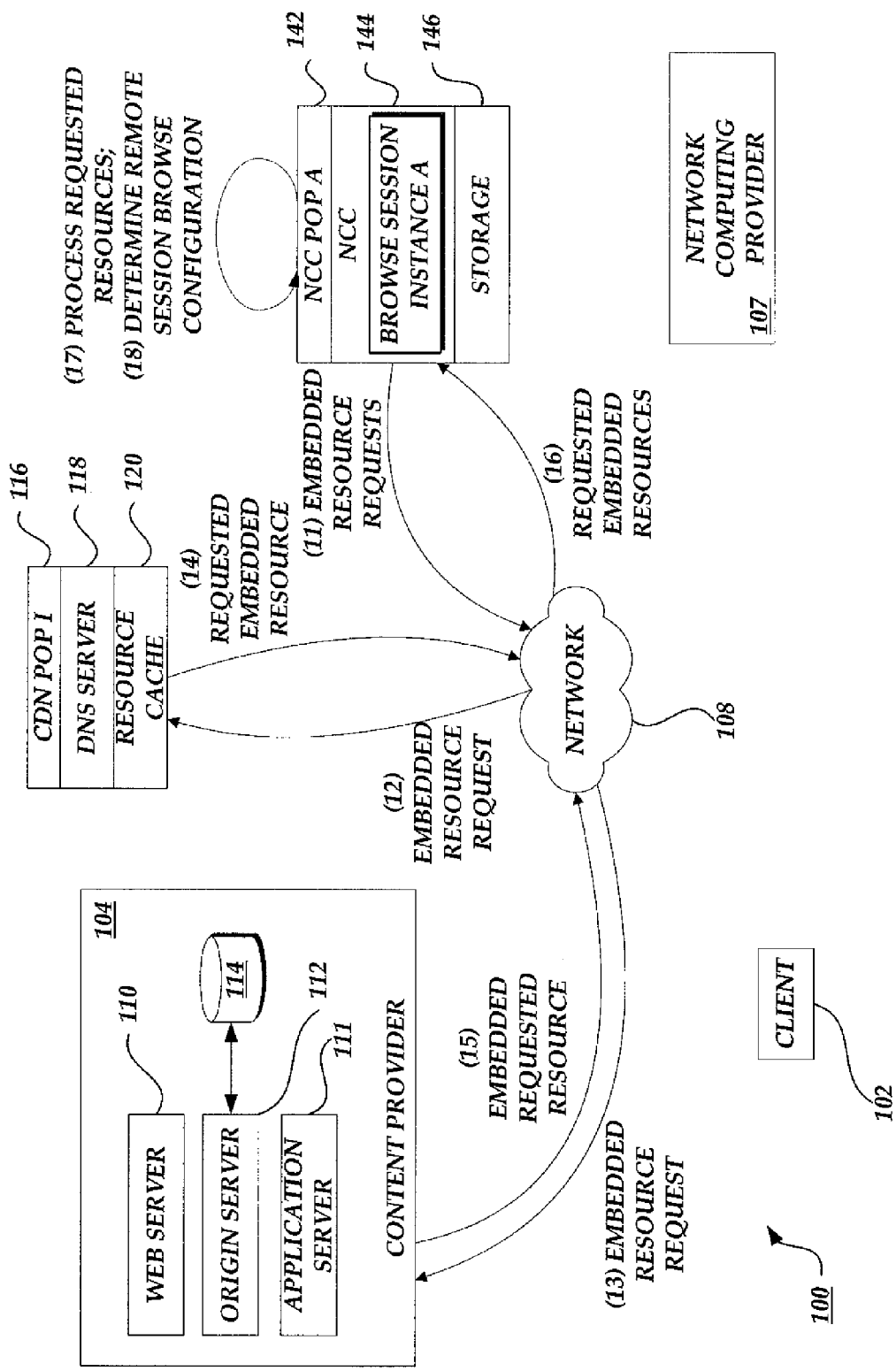
FIG. 4 is a block diagram of the content delivery environment of FIG. 1 illustrating the generation and processing of one or more requests corresponding to one or more embedded resources from a network computing provider to a content provider and content delivery network.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third-party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
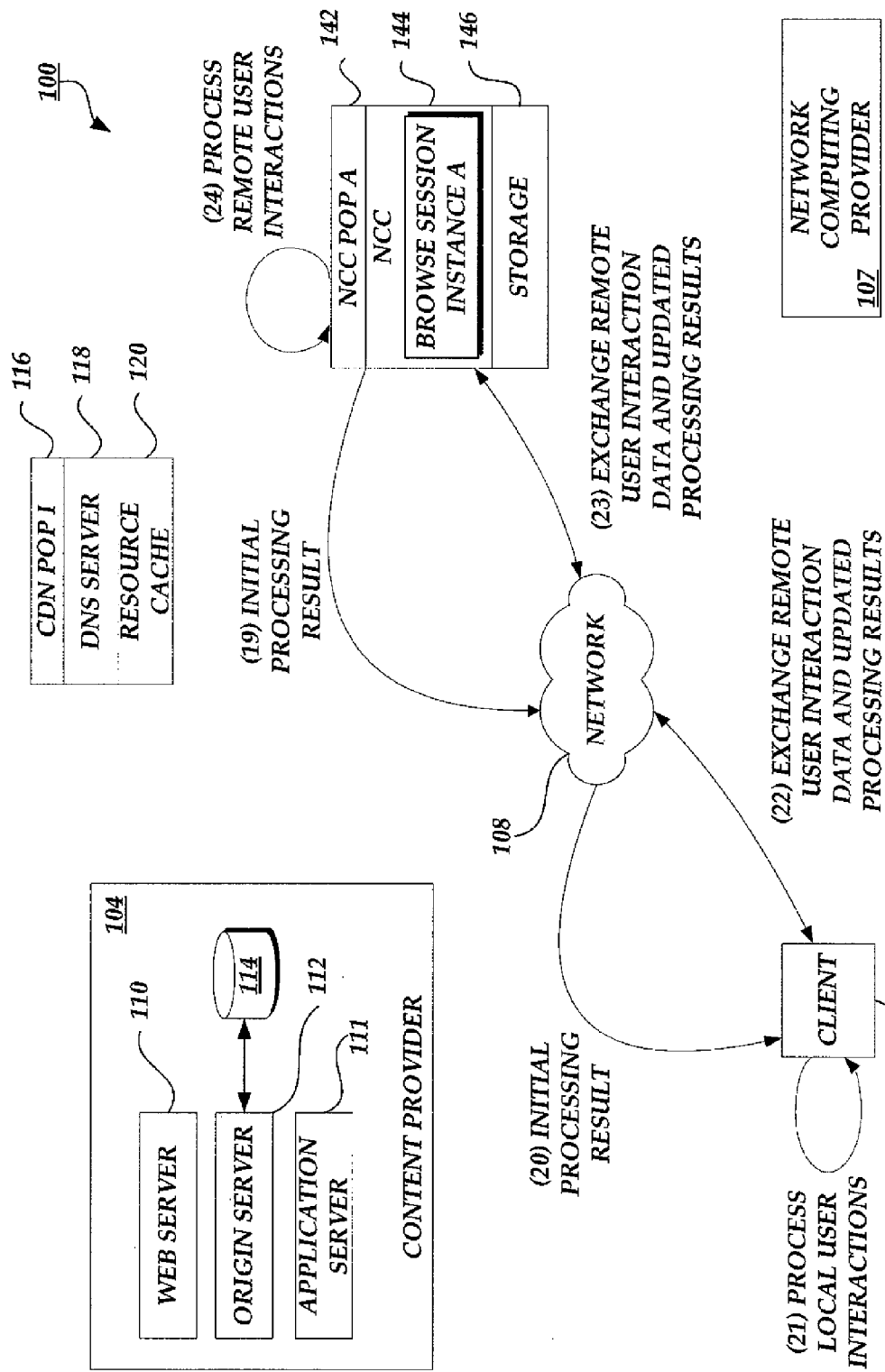
FIG. 5 is a block diagram of the content delivery environment of FIG. 1 illustrating the generation and processing of browse session data and user interaction data between a network computing provider and client computing device.

With reference to FIG. 5, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device in response to changes to the content or remote user interaction data from the client computing device.

Figure 6:
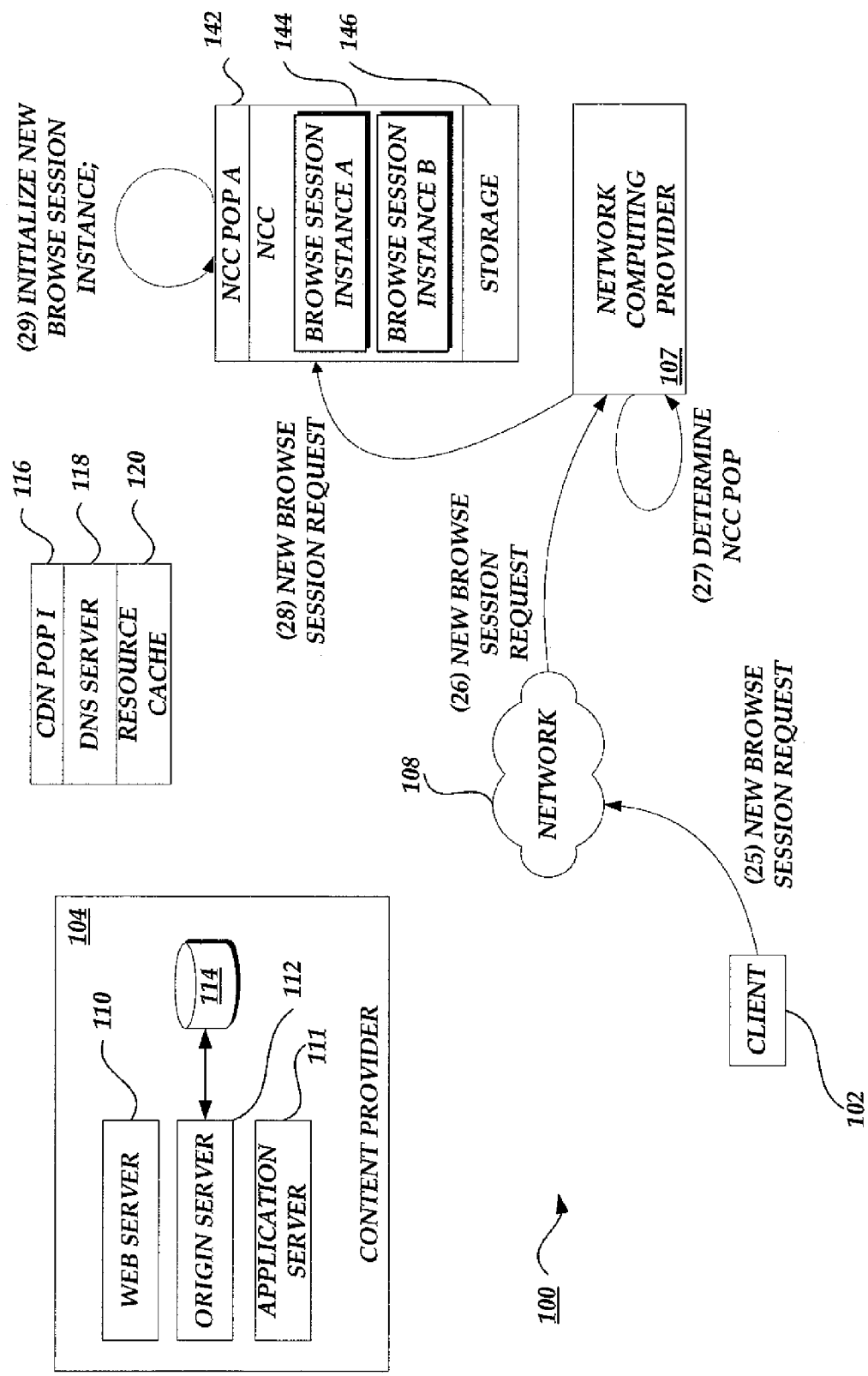
FIG. 6 is a block diagram of the content delivery environment of FIG. 1 illustrating the generation and processing of an additional new browse session request from a client computing device to a network computing provider.

With reference to FIG. 6, a block diagram of the content delivery environment of FIG. 1 illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing provider 107 may select an associated network computing component such as NCC POP 142 to service the browse session request. As discussed above with reference to FIG. 2, a network computing provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

Figure 7:
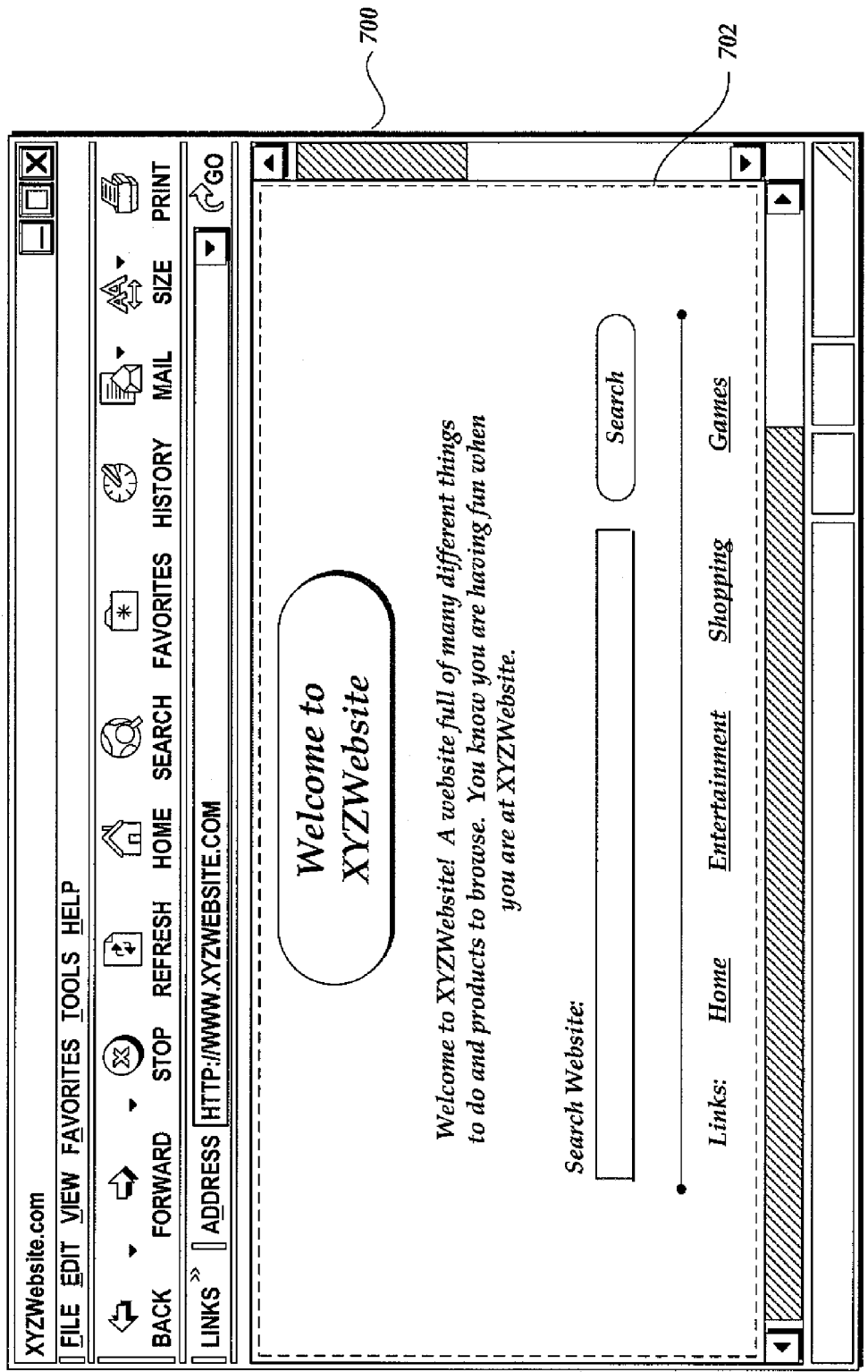
FIG. 7 is a user interface diagram depicting an illustrative browser interface and display of browse session content.

FIG. 7 is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 8:
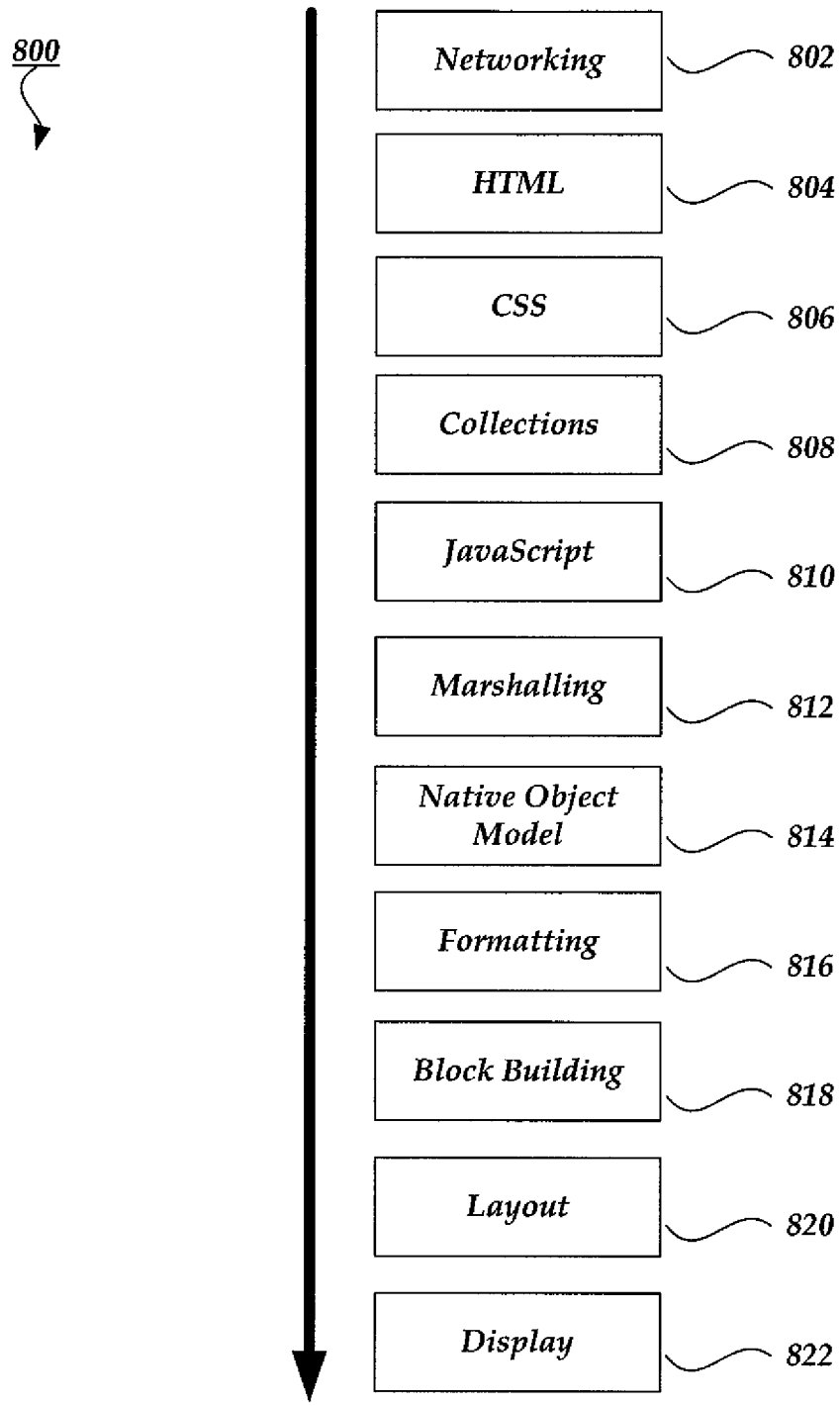
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3-5, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When JavaScript is encountered, it may be passed directly to a JavaScript subsystem 810 responsible for executing the script. The JavaScript subsystem 810 has been examined fully over the years, and may be one of the most well known browser subsystems in the art. A remote session browsing configuration that splits processing actions at a JavaScript subsystem 810 may construct a processing result including an internal representation of one or more JavaScript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
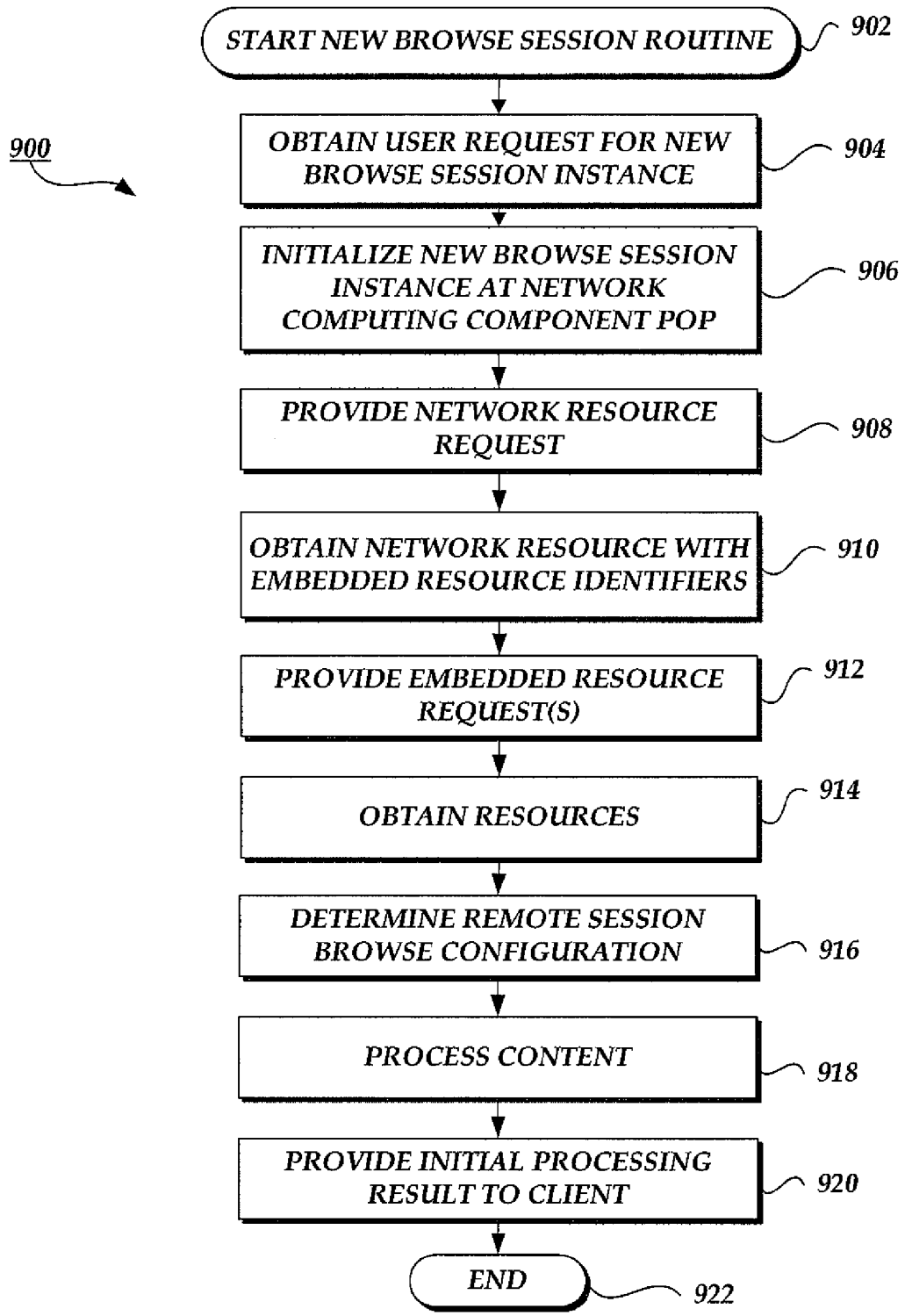
FIG. 9 is a flow diagram illustrative of a new browse session routine implemented by network computing provider.

FIG. 9 is a flow diagram illustrative of a new browse session routine 900 implemented by network computing provider 107 of FIG. 1. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternatively retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and JavaScript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, JavaScript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or JavaScript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded JavaScript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
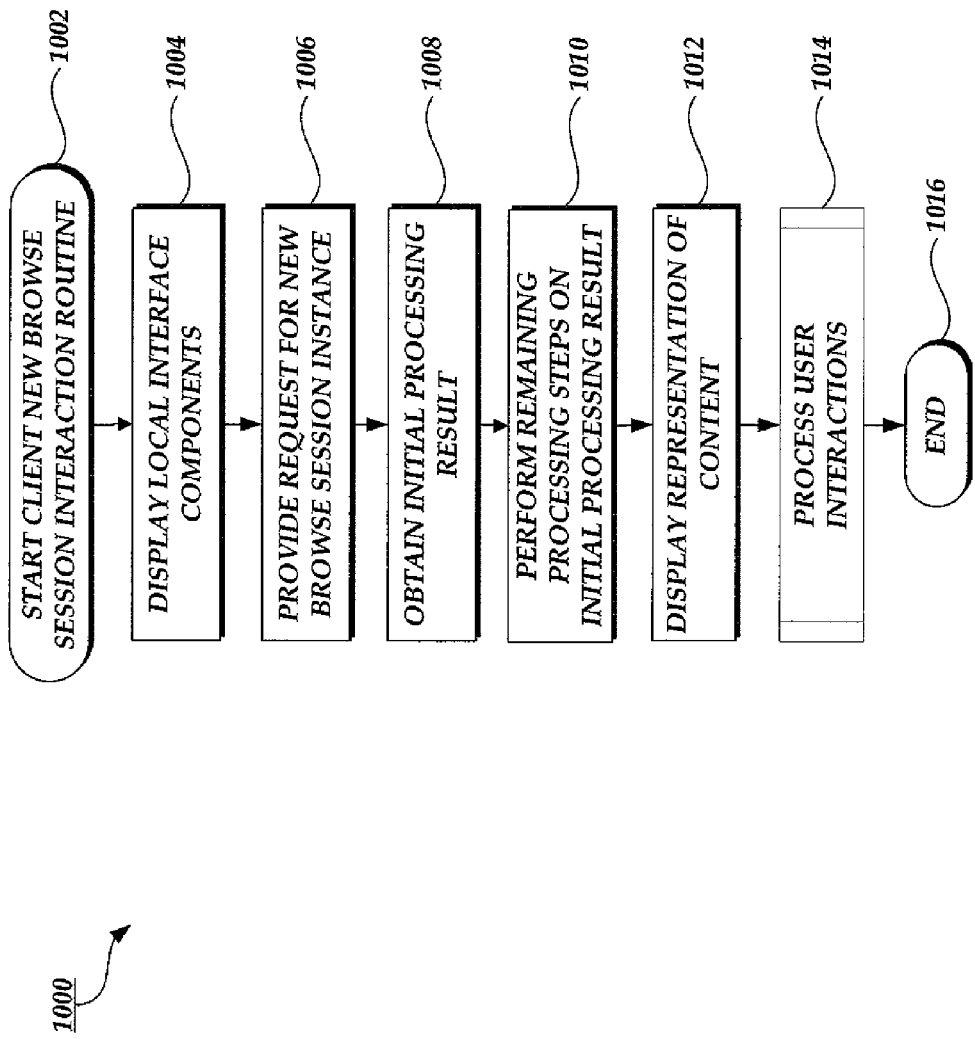
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
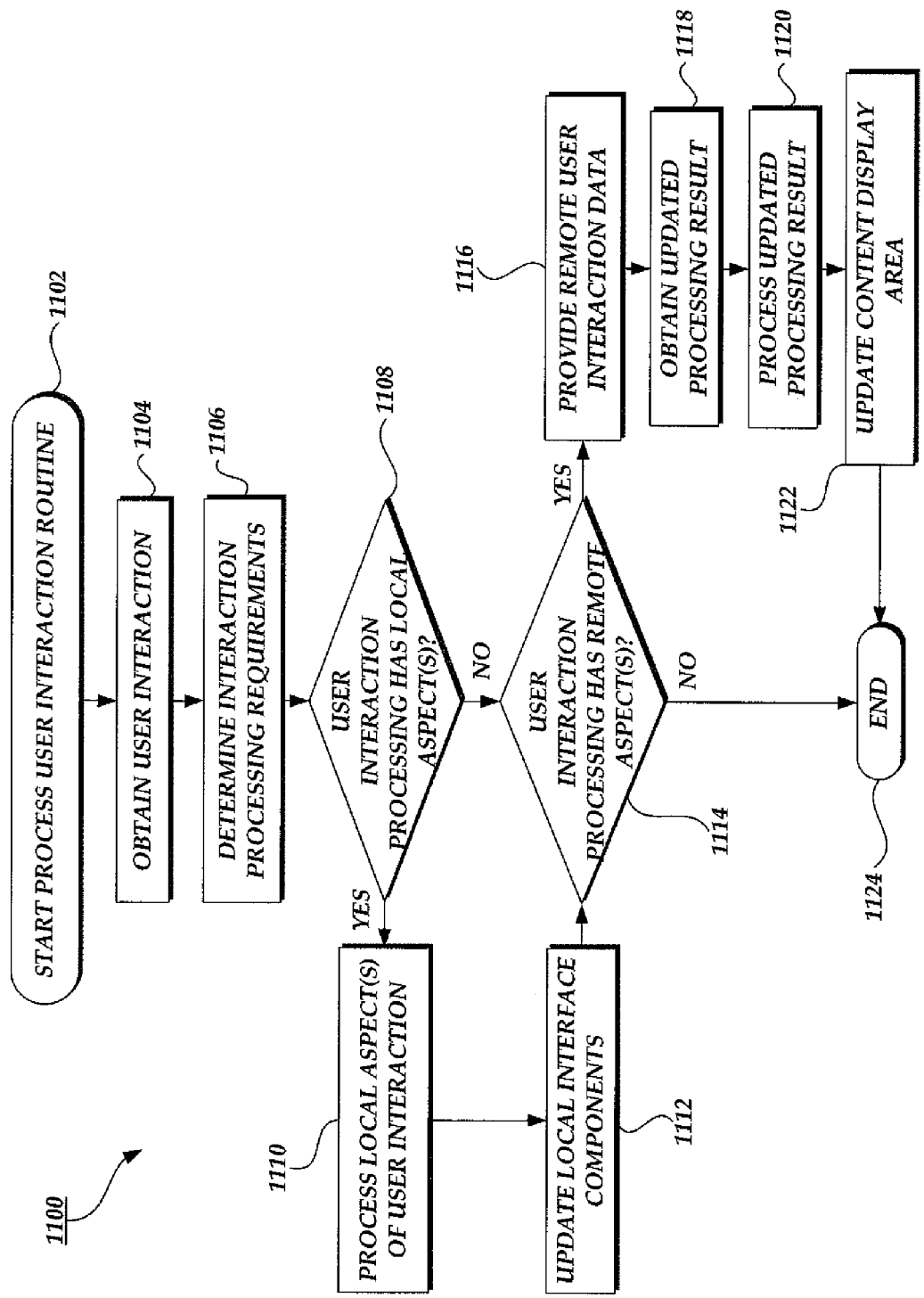
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data, such as a cursor position or keyboard input, encapsulated in one or more RDP protocol data units. In some embodiments of remote session browsing configurations utilizing RDP or other remote session communication protocols, particular aspects of remote user interaction data, such as cursor positions, may be provided to the network computing provider 107 on a continuous basis. In other embodiments of remote session browse configurations, remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration), and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
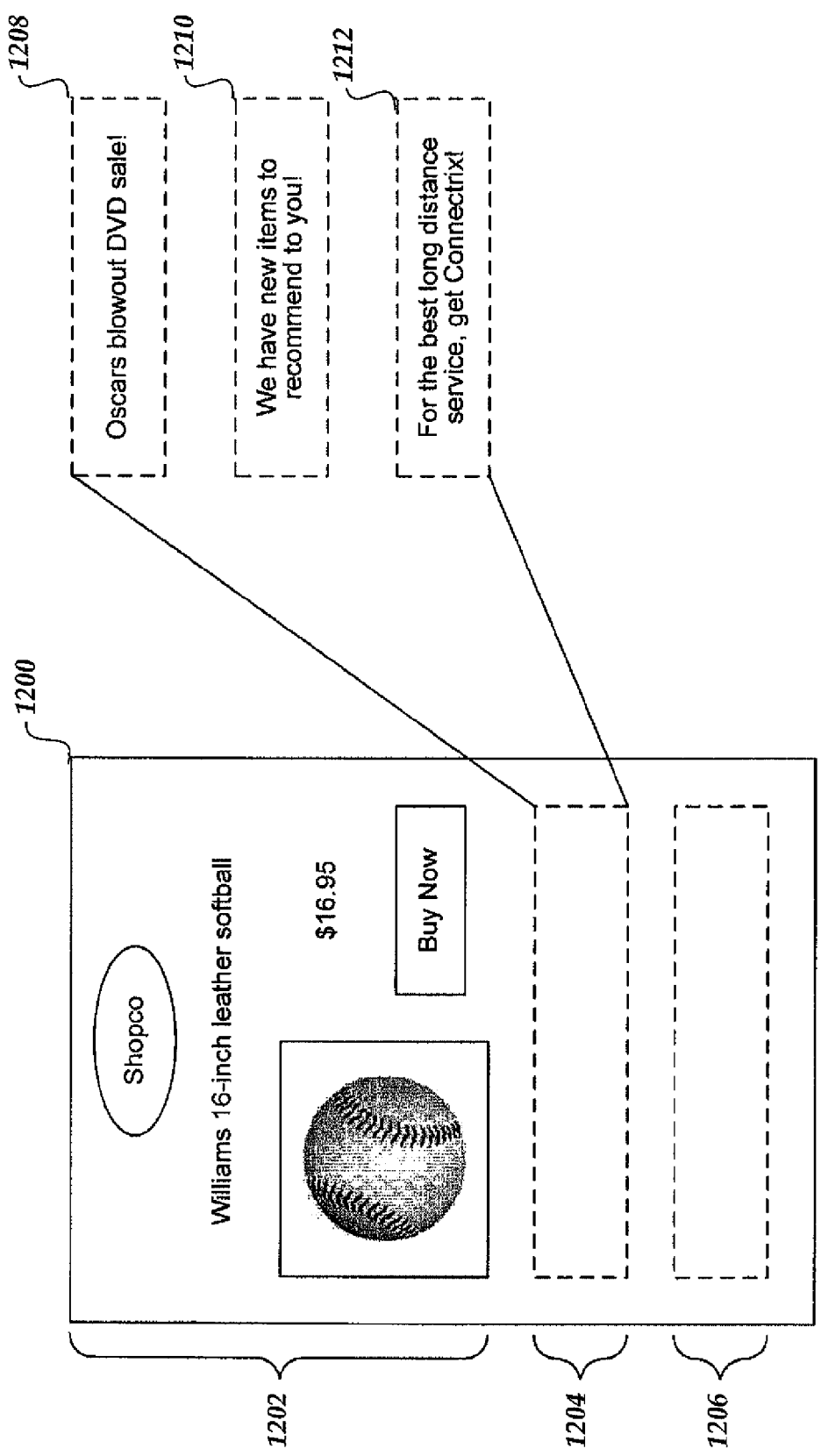
FIG. 12 is a conceptual diagram illustrative of message slots in a network resource.

FIG. 12 is a conceptual diagram illustrative of message slots in a network resource 1200. The network resource 1200 contains certain content that is native to all instances of the page, such as native content 1202 describing a softball item that is available for purchase. The page further contains two slots 1204 and 1206, each of which can contain a message selected by a content provider 104 or other message placement provider. Three sample messages 1208-1212 are shown that are candidate messages for slot 1204. In some embodiments, content provider 104 or other message placement provider identifies these candidate messages from a larger pool of messages based on one or more preliminary eligibility tests, which may be based on such factors as a current time or date, a user identity or behavior, characteristics or preferences associated with the client computing device 102 or browser, a type or topic of content, or any other factor. Slot 1206 may be associated with a different set of candidate message, depending on any number of same or different tests.

An instance of the network resource 1200 may be served or otherwise directly or indirectly provided to the user at client computing device 102. The content provider 104 or other message placement provider may select a message from the candidate messages 1208-1212 based on one or more placement factors including, but not limited to: a maximum amount bid by an advertiser or other party to display a candidate message; a lottery; a selection based on a determined effectiveness or value of a particular message to the content provider 104, other message placement provider, network computing provider 107, or any other entity; a subscription agreement with an advertiser or other party; a purchase of a particular slot or placement; and/or any other factor related to the client computing device, network computing provider 107, content provider 104, or other message placement provider.

In some embodiments, a message associated with a third-party advertiser may be associated with a variable or contingent value or bid. For example, an advertiser may agree to pay the publisher when a message is selected or when an action is performed by the user at the client computing device. For example, an advertiser may offer $2.00 if the display of the message leads to the provision of a mailing address by a user, and $1.00 if the display of the message leads to the provision of an electronic mailing address by a user. In various embodiments the content provider 104 or other message placement provider may weigh various bids or values associated with each message in any number of ways, as known in the art.

In alternative embodiments, the content provider 1204 may determine that all, or substantially all, of the message placement slots, such as message placement slots 1204 or 1206, may be populated with blank or no messages. For example, the content provider 1204 may determine that a user may qualify for alternative messages that do not include any content for rendering by the client computing devices 102. In such embodiments, the content provider 104 may cause the layout or order of the network resource 1200 to be modified to incorporate additional or alternative content or to otherwise reflow the previously displayed content.

Figure 13:
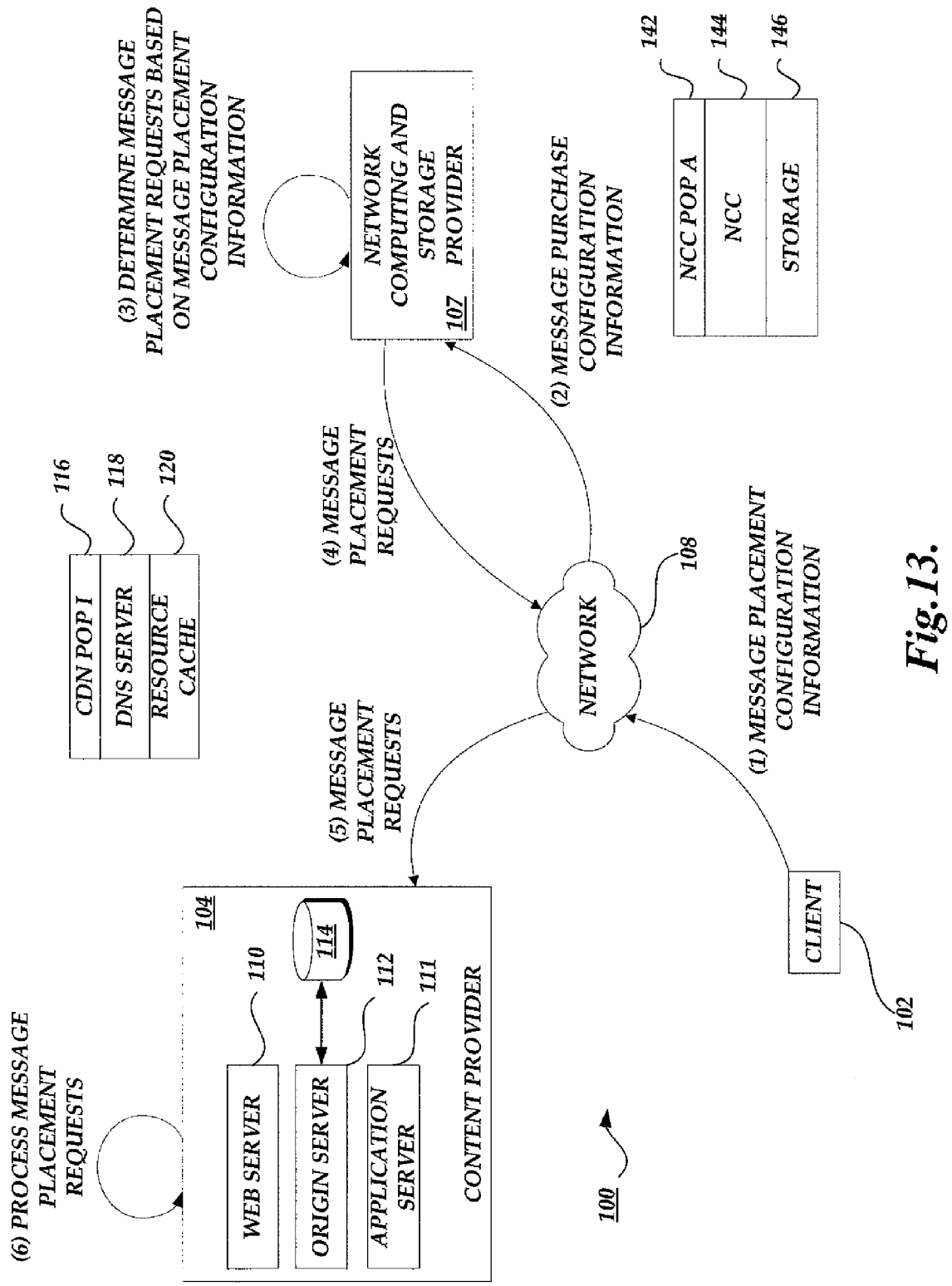
FIG. 13 is a block diagram of the content delivery environment of FIG. 1 illustrating the generation and processing of message placement requests between a client computing device, a network computing provider, and a content provider.
Figure 14:
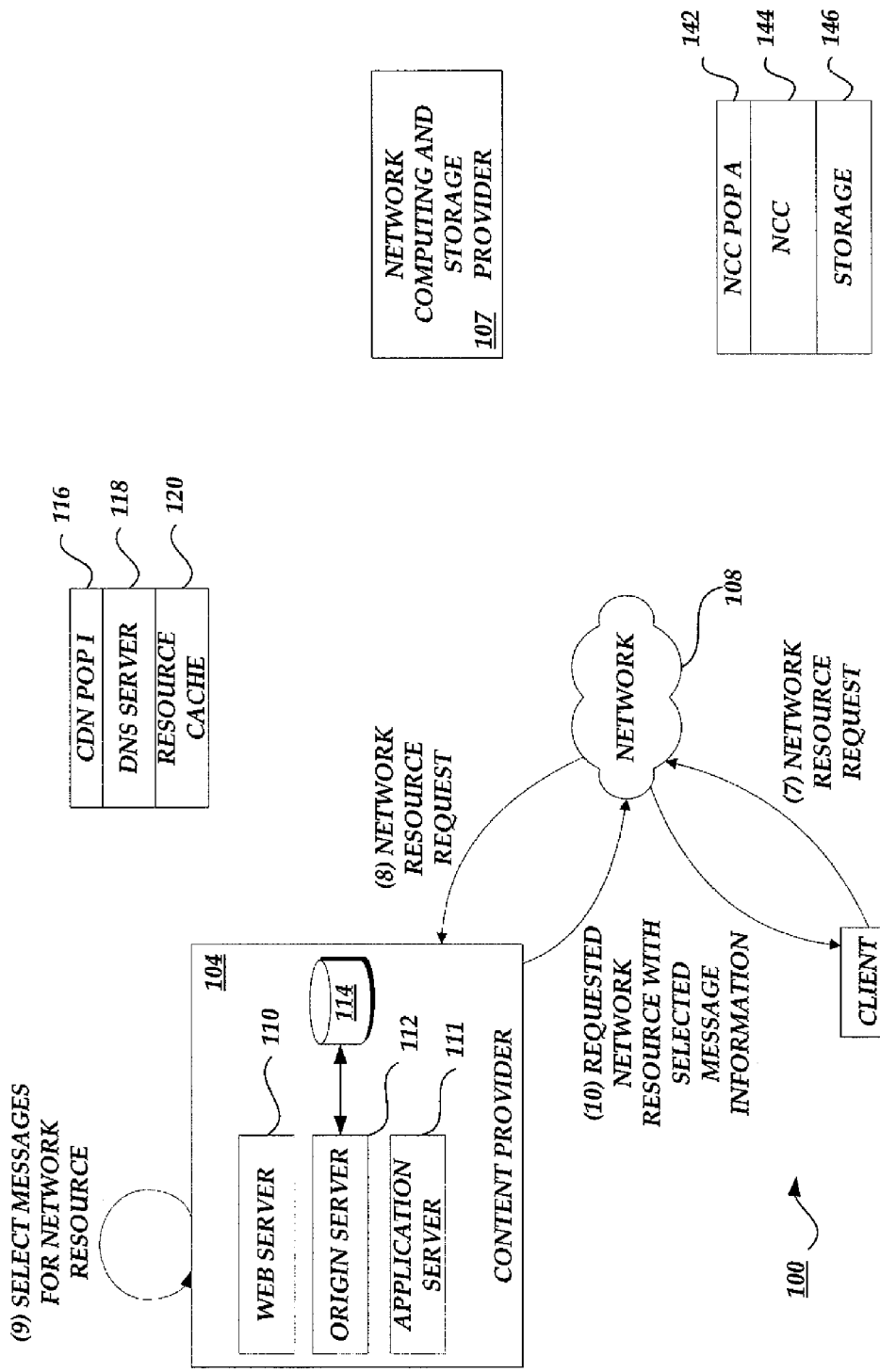
FIG. 14 is a block diagram of the content delivery environment of FIG. 1 illustrating the generation and processing of a requested network resource and message information between a client computing device and a content provider.

With reference now to FIGS. 13 and 14, the interaction between various components of the networked computing environment 100 of FIG. 1 will be illustrated. Specifically, FIGS. 13 and 14 illustrate embodiments of interactions between various components of the networked computing environment 100 for the exchange of message placement configuration information and message placement requests between a client computing device 102 and a content provider 104 via the network computing provider 107, and further for the exchange of content between the client computing device 102 and the content provider 104. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

FIG. 13 is a block diagram of the content delivery environment of FIG. 1 illustrating the generation and processing of message placement requests between a client computing device 102, a network computing provider 107, and a content provider 102. FIG. 13 may begin with a client computing device 102 providing message placement configuration information to a network computing provider 107 over network 108. Illustratively, the message placement configuration information may identify one or more alternative messages and/or include placement preference information as described in further detail below with reference to FIG. 17. The message placement configuration information may be defined or provided by a user at client computing device 102, associated with a browser or client computing device 102, or dynamically determined based on any number of factors. In one embodiment, message placement configuration information may be provided to the network computing provider 107 by means of a network interface or an API provided by the network computing provider 107.

Illustratively, the network computing provider 107 may determine one or more message placement requests based on the message placement configuration information obtained from the client computing device 102. In one embodiment, the message placement requests may be associated with bids or requests to purchase placements in content provided by the content provider 104 for one or more of the alternative messages referenced in the message placement configuration information. Subsequent to determining the message placement requests, the network computing provider 107 may transmit the message placement requests to the content provider for processing. The message placement requests may be provided to the content provider 104 in any format accepted by the content provider 104, and may be transmitted via any medium or communications protocol known in the art. Subsequent to obtaining the message placement requests, the content provider may process the message placement requests, for example determining future placement of the one or more alternative messages in various served network resources or other content. In one embodiment, this may include comparing bids or purchase offers in the provided message placement requests against other bids by advertisers or other parties interested in placing messages within served content.

FIG. 14 is a block diagram of the content delivery environment of FIG. 1 illustrating the generation and processing of a requested network resource and message information between a client computing device 102 and a content provider 104. In one embodiment, FIG. 14 may begin subsequent to the interactions described with regard to FIG. 13 above. As described with regard to FIG. 13, the content provider 104 may have processed the message placement requests, for example, determining a future placement of the one or more alternative messages in served network resources or other content. The client computing device 102 may provide a request for a network resource to the content provider 104. For example, the browser at the client computing device may request a Web page or other network content as is known in the art. The content provider 104 may receive the network resource request and select messages for inclusion in the network resource. Illustratively, the content provider may have predetermined messages for inclusion in the network resource based on the message placement requests, or may determine messages for inclusion in the network resource responsive to the network resource request from the client computing device 102. In one embodiment, selecting messages for the network resource includes determining one or more messages for each slot in the requested network resource. Illustratively, some selected messages may be alternative messages based on the message placement requests discussed above with regards to FIG. 13.

Subsequent to selecting messages for the network resource, the content provider 104 may provide the network resource to the client computing device 102 including information regarding one or more selected message. Illustratively, the selected message information may include messages themselves, or may include identifier, references, or other code associated with the selected messages. The client computing device 102 may display the network resource in a browser, including the selected messages based on the selected message information. Illustratively, one or more of the selected messages displayed in slots in the network resource may be alternative messages based on the message placement requests.

Figure 15:
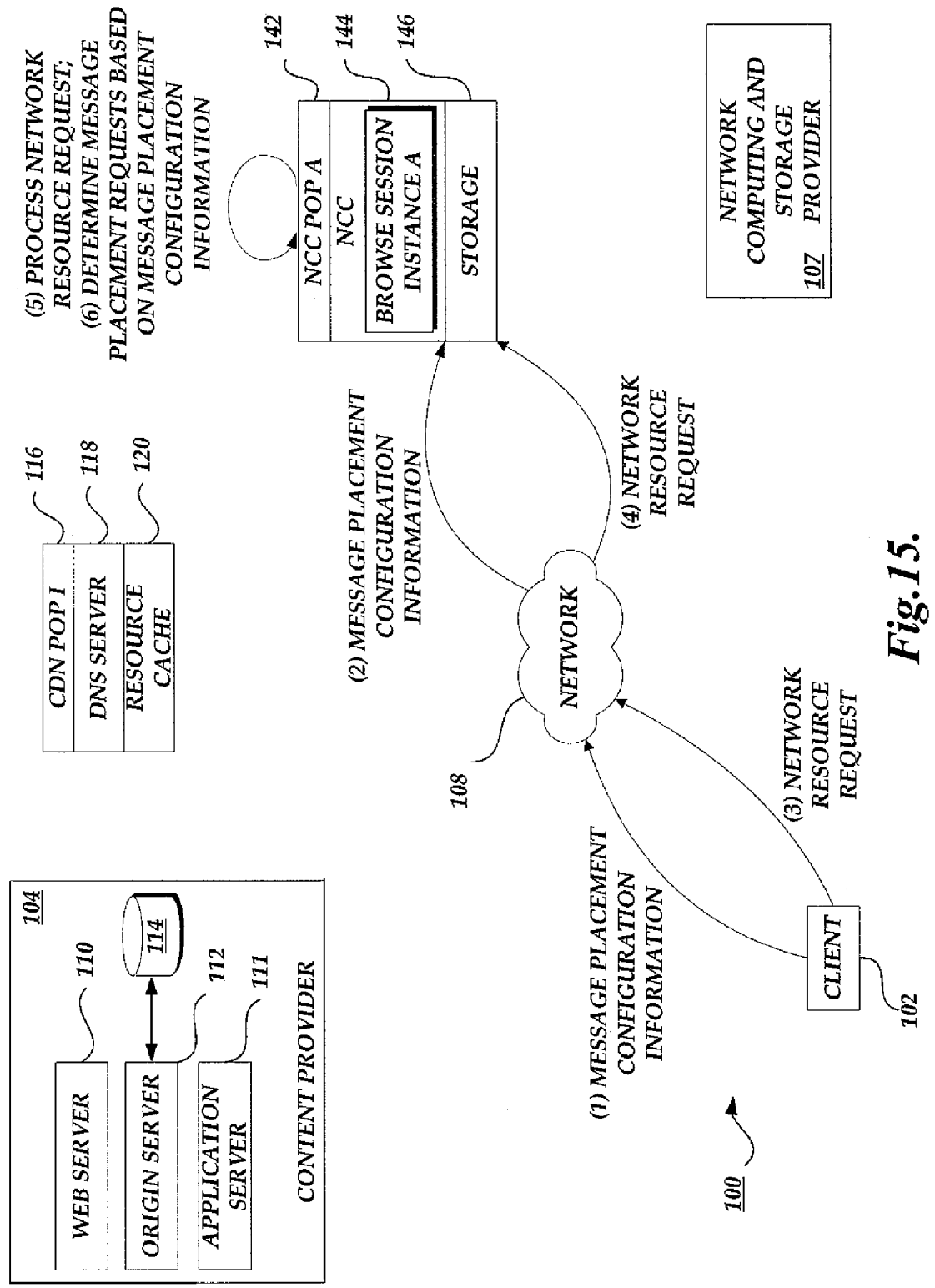
FIG. 15 is a block diagram of the content delivery environment of FIG. 1 illustrating the generation and processing of message placement configuration information and a network resource request from a client computing device to a network computing provider.
Figure 16:
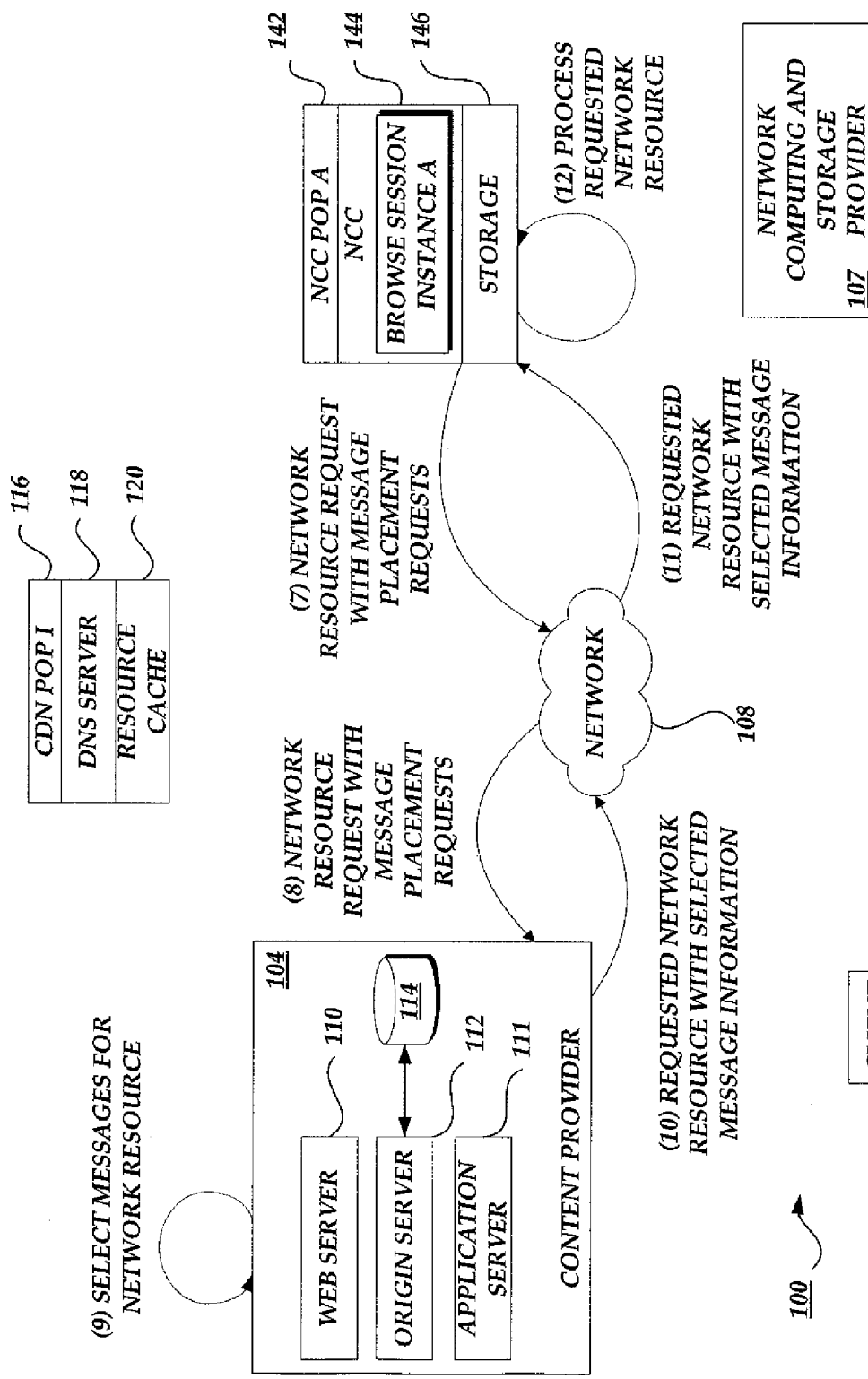
FIG. 16 is a block diagram of the content delivery environment of FIG. 1 illustrating the generation and processing of message placement purchase requests and network resources between a network computing provider and a content provider.

With reference now to FIGS. 15 and 16, the interaction between various components of the networked computing environment 100 of FIG. 1 will be illustrated. Specifically, FIGS. 15 and 16 illustrate embodiments of interactions between various components of the networked computing environment 100 for the exchange of message placement configuration information, message placement requests, and network resources between a client computing device 102 and a content provider 104 via the network computing provider 107. For purposes of the example, however, the illustration has been simplified such that many of the components utilized to facilitate communications are not shown. One skilled in the relevant art will appreciate that such components can be utilized, and that additional interactions would accordingly occur without departing from the spirit and scope of the present disclosure.

FIG. 15 is a block diagram of the content delivery environment of FIG. 1 illustrating the generation and processing of message placement configuration information and a network resource request from a client computing device 102 to an NCC POP 142 of a network computing provider 107. FIG. 15 begins with the client computing device 102 providing message placement configuration information to an NCC POP 142 of a network computing provider 107. Illustratively, in various embodiments, the obtaining of message placement configuration information or any other functionality or interaction described herein may be performed by the network computing provider 107 directly, or by any other component or entity associated with the network computing provider 107.

Subsequently to providing the message placement configuration information, the client computing device 102 may provide a network resource request to the NCC POP 142. Illustratively, for the purposes of illustration, the network resource may be associated with a browse session instance instantiated at the NCC POP 142 and/or may be included in a new browse session request as illustratively described above with reference to FIGS. 2-11. In addition to any processing of the network request with regard to remote browsing as discussed above with reference to FIGS. 2-11, the NCC POP 142 may process the network request and determine message placement requests based on the message placement configuration information. In one embodiment, the NCC POP 142 may additionally determine the message placement requests based on one or more characteristics of the network resource request. In a further embodiment, the NCC POP 142 may provisionally request the network resource to determine any information that may be of use in determining message placement requests (e.g., a number of message slots in the network resource, a type of content, etc.).

FIG. 16 is a block diagram of the content delivery environment of FIG. 1 illustrating the generation and processing of message placement purchase requests and transmission of network resources between a network computing provider and a content provider. In one embodiment, FIG. 16 may begin subsequent to the interactions described with regard to FIG. 15 above. Illustratively, the NCC POP 142 may have determined one or more message placement requests based on any combination of message placement configuration information, a network resource request from the client computing device 102, and one or more characteristics or information associated with the network resource itself. The NCC POP 142 may provide a network resource request to the content provider 104 over the network 108. Illustratively, subsequently to, prior to, or simultaneously with the network resource request, the NCC POP 142 may transmit the one or more determined message placement requests to the content provider 104. In one embodiment, the NCC POP 142 may provide message placement requests that reference or otherwise identify the requested network resource, such as message placement requests that specify a bid on a message placement for the specific requested network resource.

The content provider 104 may receive the network resource request with the message placement requests, and may select messages for the network resource based on the message placement requests and any other information relating to the placement of messages in the network resource, such as bids by advertisers or third-parties. Upon selecting messages for the network resource, the content provider 104 may provide the requested network resource with information associated with the selected messages to the NCC POP 142 for processing. In one embodiment, the NCC POP 142 may process the network resource and any associated messages to provide processing results to the client computing device 102 as discussed above with reference to FIGS. 2-11.

Figure 17:
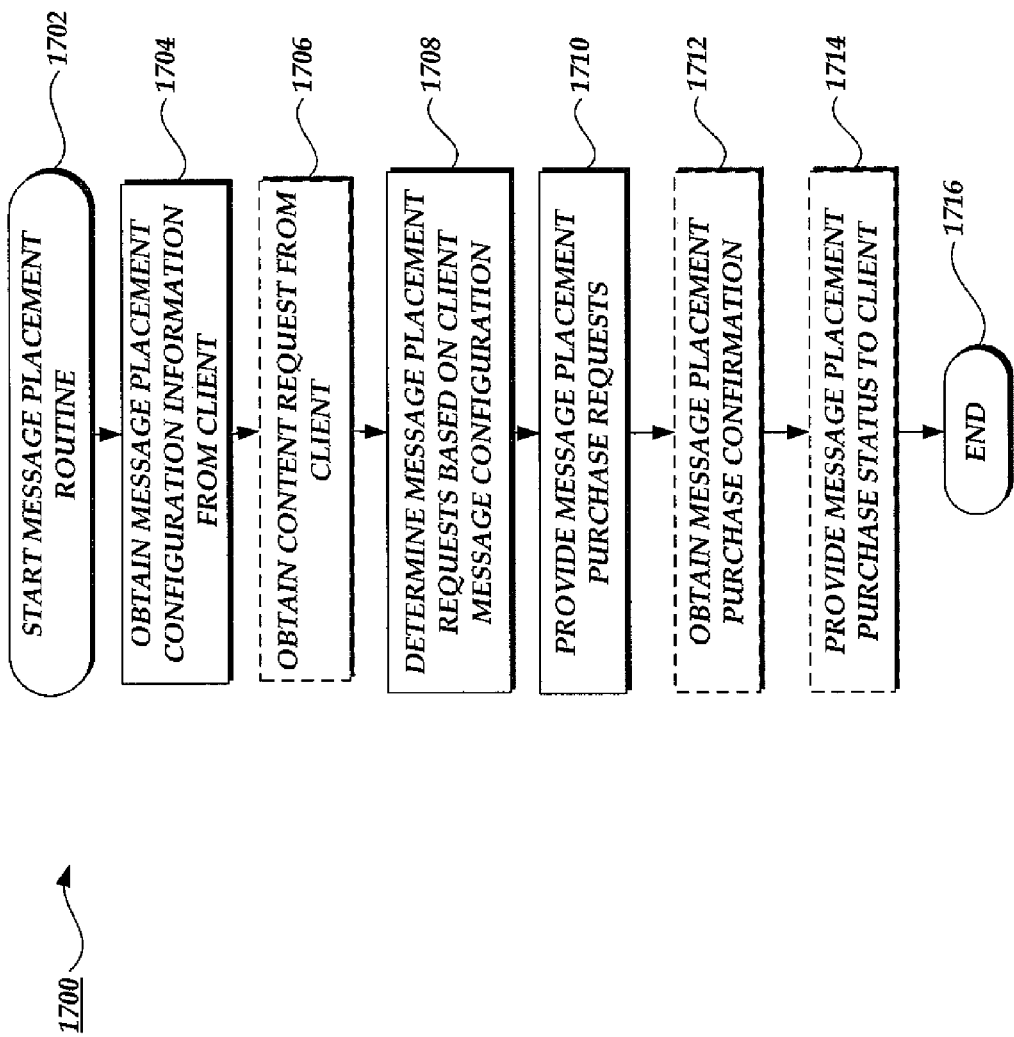
FIG. 17 is a flow diagram illustrative of a message placement routine implemented by a network computing provider.

FIG. 17 is a flow diagram illustrative of a message placement routine 1700 implemented by a network computing provider 107. FIG. 17 may begin with a client computing device 102 providing message placement configuration information to a network computing provider 107 over a network 108. Illustratively, the message placement configuration information may be associated with the placement of alternative messages in content displayed in the software browser application. The message placement configuration information may be associated with a browser or client computing device 102, defined or provided by a user at client computing device 102, or dynamically determined based on any number of factors. In one embodiment, message placement configuration information may be provided to the network computing provider 107 by means of a network interface or an API provided by the network computing provider 107. In one embodiment, the message placement configuration information may include or reference one or more alternative messages or references to alternative messages for display in accessed content, and may further include preference information associated with the placement of the alternative messages.

Alternative messages may include any textual content, script, image, video, animation, or other content capable of being displayed in a slot in network content displayed at a client computing device 102. For example, alternative messages may include pictures of a user's family, or other pictures selected by the user, may include poetry or other text selected by the user, or any other content. In one embodiment, alternative messages may include blank or quickly downloadable content (e.g., a 1-by-1 pixel spacer image) in order to minimize load time of a network resource. Alternative messages may be in any format allowed by the browser, content provider 104, network computing provider 107 and/or other entity. In some embodiments, certain network content may include slots of a particular size, shape, or configuration. In one embodiment, message placement configuration information may provide alternative messages corresponding to one or more various standard or know shapes, sizes, or configuration. In other embodiment, the network computing provider 107, content provider 104, or any other entity may automatically crop, resize, and/or modify one or more alternative messages to fit a particular slot in a piece of network content. Illustratively, the message placement configuration information may include one or more alternative messages in full, may include identifiers or references to alternative messages, or any combination thereof. For example, message placement configuration information may include a first alternative message consisting of data comprising an image, and a second alternative message consisting of a URL of an image at a network data store.

Message placement configuration information may further include preference information associated with the placement of alternative messages in network content. This preference information may include, but is not limited to, various information specifying financial constraints or preferences on the bidding or purchase of message placement, may specify a manner in which particular alternative messages are to be placed, may specify preferences regarding content providers 104 or third-party message placement providers, may include preferences as to placement in particular slots or network content, may include a placement goal, or may include any other preference associated with the placement and bidding or purchase of alternative message placement in network content. Illustratively, information specifying financial constraints or preferences may include a maximum amount to bid or pay for one or more slots, alternative messages, pieces or categories of content, etc.

In one embodiment, financial constraints or preferences may further include, but are not limited to, a bidding strategy (e.g., instructions to bid certain amounts in certain conditions, or to vary bids according to an algorithm or schedule), a maximum authorized amount to spend associated with a fixed period of time (e.g., monthly), a rate to spend, financial purchase information (e.g., account information, etc.), or any other information regarding bidding, purchase, price, or other financial factor. In a further embodiment, a user may be a member of a group of users, managed by a network content and storage provider 107 or other entity, that pool funds to buy a large group of alternative message placements. Illustratively, the network content and storage provider 107 may provide information associated with a group donation or fee that will be used in determining funds for various message placement requests determined below with regard to block 1708.

In some embodiments, the bidding or purchase of slots or message placement with one or more content providers or third-party message placement providers may be performed on the basis of credits, points, or other non-financial metric or value system. For example, in one embodiment, a user may receive a number of credits with a network computing provider 107 or content provider 104 for performing various actions, such as purchasing goods through one or more content providers or online merchants. The user may be able to "spend" these credits by bidding on or purchasing placements or slots in network content displayed at the client computing device 102 associated with the user. Illustratively, any non-monetary system of exchange may be treated similarly to a financial system of exchange as described herein.

Message placement configuration information may further specify a manner in which particular alternative messages are to be placed, including limiting or encouraging the placement of particular alternative messages in various conditions or situations, including, but not limited to, certain times of the day, certain dates, when certain users are logged in or are otherwise detected as accessing a browser, when a specific browser is used, etc. For example, in one embodiment, a user may specify that alternative message placements should not be purchased when he is accessing content from a client computing device 102 or browser associated with his work, but that alternative message placements should be purchased when he is accessing content from a client computing device 102 or browser associated with his home. As another example, a user may specify that a first set of alternative messages are placed between certain hours of the day that he knows his children will be browsing, and a second set of alternative messages are placed when he is likely to be browsing himself.

In another embodiment, message placement configuration information may include preferences regarding content providers 104 or third-party message placement providers. For example, the message placement configuration information may specify that no alternative message placements be purchased with particular content providers or third-party message placement providers. Message placement configuration information may further include preferences as to placement in particular slots or network content, including, but not limited to, limitations or preferences as to a type, topic, or other characteristic of content to place alternative messages in; preferred types, sizes, or other characteristics of slots to place alternative messages in, etc.

Message placement configuration information may still further include any number of general or specific placement goals for further determination of message placement requests by the network computing provider 107. Placement goals may include, but are not limited to, a goal of blocking the most pixels on displayed content, optimizing content load at the client computing device, replacing messages that are determined to be the most distracting with alternative messages, allowing a maximum number of advertisements per piece of content, substituting alternative messages for all messages (e.g., advertisements) of a certain type, or tiering alternative message placement so that, for example, certain factors or placement preferences are applied in the case of different types or tiers or content.

Illustratively, message placement configuration information may include any one or combination of any factor or information, and/or factor weights or other decision information for balancing or determining between various factors. Message placement configuration information may be provided to the network computing provider 107 through an API, network interface, or through any other means. Illustratively, in one embodiment, the client computing device 102 may process message placement configuration information itself and send message placement requests directly to a content provider 104 or third-party message placement provider. In still other embodiments, the client computing device may send message placement configuration information directly to the content provider 104 or third-party message placement provider.

In optional block 1706, the network computing provider 107 may obtain a content request from the client computing device 102. For example, the network computing provider may receive a new browse session request or a content request (e.g., a request for a Web page or other network resource) associated with an existing browse session as described with reference to FIGS. 2-11 above. Illustratively, the network computing provider 107 may process the content request to obtain various information about a requested network resource, such as identifying an associated content provider 104, CDN service providers 106, or third-party message placement provider. In other embodiments, the network computing provider 107 may make a first request for the requested content from a content provider 104 or CDN service providers 106. Illustratively, the network computing provider 107 may identify various characteristics of the requested content (e.g., a number and/or configuration of message slots) for use in determining message placement requests. In one embodiment, one or more identifying aspects or other message placement configuration information may be provided in a cookie associated with a user or browser and associated with the content request or requested content.

In block 1708, the network computing provider 107 may determine message placement requests. In one embodiment, the determination of message placement requests may be based on any factor or combination of factors included in the message placement configuration information or other information discussed above with regards to blocks 1704 and 1706. Various factors may be weighted according to user preferences or a determination by the client computing device 102, network computing provider 107, or any other entity. Illustratively, the network computing provider 107 may optimize the bidding or purchasing of alternative messages based on the limitations and preferences included in the message placement configuration information. In one embodiment, the network computing provider 107 may optimize and determine between the various factors based on simple comparison, linear calculations, or based on any other optimization or decision algorithm, as known in the art.

Message placement requests may contain information identifying or associated with one or more alternative messages, and a bid, price, value, or other information to be used by the content provider 104 or third-party message placement provider in selecting an alternative message. The actual format and means for the transmission of message placement requests may vary based on the particular content provider 104 or third-party message placement provider that they are intended for. In various embodiments, the particular content provider 104 or third-party message placement provider associated with a particular network resource or other piece of network content may be determined based on a network content request, a new browse session request, processing of the network content itself (e.g., based on an initial download or an examination of the network content in a cache associated with the network computing provider 107), a network address, a URL, a sub-domain, and/or on aggregated information based on content requested by other users. For example, if all content provided to users at a particular base URL has been associated with a particular third-party message placement provider, the network computing provider 107 may treat a request associated with the base URL as similarly associated with the same third-party message placement provider. Illustratively, message placement requests may be provided to any number of content providers 104 and/or third-party message placement providers. In one embodiment, message placement requests may only be provided to a content provider 104 or third-party message placement provider associated with a particular piece of network content. In other embodiments, message placement requests may be provided to groups, tiers, or any number or set of content providers 104 or third-party message placement providers.

In one embodiment, message placement requests may include subscription information and/or be directed to content providers 104 or third-party message placement providers that are included in a message placement subscription scheme. For example, in one embodiment, a subscription model may be used that allows a client computing device 102 or user to place a certain number or value of alternative messages with a content provider 104 for a fixed fee. In an alternative embodiment, a subscription model may allow a client computing device or user to place alternative messages for some or all slots in some or all content displayed at a client computing device. For example, a user may have a subscription with a content provider 104 or a group of content providers 104 to only place alternative messages on requested content. As another example, a user may have a subscription with a network content and storage provider 107 that allows the user to place alternative messages on all or a subset of representations of content received through remote content browsing, such as described, for the purposes of illustration in FIGS. 2-11.

In a further embodiment, a content provider 104, network computing provider 107, or other third-party message manager component or message placement provider may allow a user to purchase alternative message placements specific to a particular user, browser, or client computing device 102. Accordingly, in the context of this embodiment, alternative messages may only be placed in content requested and/or displayed by a particular user, browser, and/or client computing device 102. For example, a content provider 104 may accept message placement requests specific to a particular user, and may only select the associated alternative messages for slots in provided content when content requests are identified as being from the particular user. Illustratively, membership in a subscription service may be indicated by any number of types of information including, but not limited to, a cookie associated with a user or browser, a network address or sub-domain, information included in a content request or new browse session request (e.g., in the header or body of a request), in information sent by a network computing provider 107 in association with a content request on the behalf of the user, browser, or client computing device, or in any other way.

Returning to FIG. 17, at block 1710 the network computing provider 107 may provide the message placement requests to the content provider 104 or third-party message placement provider. The content provider 104 or third-party message placement provider may illustratively select messages to include in requested content by comparing bids or values, or any other method of selecting messages as known in the art. In one embodiment, the content provider 104 or third-party message placement provider may select messages to include in requested content in advance of a content request. In another embodiment, a content provider 104 or third-party message placement provider may select a message to include in requested content responsive to the content request. Illustratively, the content provider 104 or third-party message placement provider may select one or more alternative messages to include in content requested by the user, browser, or client computing device 102. The content provider 104 or third-party message placement provider may, depending on bidding and the message placement requests, also select some messages not associated with alternative messages selected by the user. Illustratively, content provided by the content provider 104 in response to a subsequent content request may include the selected one or more alternative messages, as well as any other selected messages.

In one embodiment, the network computing provider 107 may negotiate with a content provider 104 or third-party message placement provider when providing message placement purchase requests. For example, the network computing provider 107 may request a highest bid for various slots in various network content prior to sending a set of bids in one or more message placement purchase requests. In other embodiments, a network computing provider 107 may provide a second bid if a first bid is unsuccessful, or may negotiate with the content provider 104 or third-party message placement provider for a flat placement fee or subscription price in order to provide a maximum benefit for a given cost.

In various embodiments, the network computing provider 107 may provide representations of requested content to the client computing device by means of a remote browsing session, as described with regard to FIGS. 2-11, or in any other way. Illustratively, in some embodiments, the network computing provider 107 may process content obtained from a content provider 104 or CDN service provider 106 and replace advertisements or other messages included in slots in the content with alternative messages selected by the user at the client computing device 102. In one embodiment, the network computing provider 107 may provide the content provider 104 or third-party message placement provider with a payment or other benefit to compensate for the replaced message not being viewed by the user at the client computing device 102. Illustratively, a payment from the network computing provider 107 to the content provider 104 or third-party message placement provider may match, or be different than a maximum bid or payment associated with the purchase of a placement of the alternative message at the content provider 104 or third-party message placement provider. Illustratively, the network computing provider 107 replacing messages with alternative messages and compensating the content provider 104 or third-party message placement provider may allow a content provider 104 or third-party message placement provider to profit from the display of alternative messages on the behalf of a user, without requiring new functionality or interactions at the content provider 104 or third-party message placement provider itself.

At block 1712, the network computing provider 107 may receive a message placement purchase confirmation from one or more content providers 104 or third-party message placement providers. At block 1714, the network computing provider 107 may provide a message placement purchase status to the client computing device 102. Illustratively, this message placement purchase status may include a summary of accepted bids on various slots of various content, or any other summary information. At block 1716, the routine 1700 ends. Illustratively, network content subsequently requested by the client computing device 102 may include one or more alternative messages in addition to, or as an alternative to, messages associated with one or more third-parties.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternative implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for advertisement placement management comprising:
as performed by advertising management component comprising one or more computing devices configured to execute specific instructions,
obtaining, at the network advertising management component, advertisement alternative placement configuration information from a client computing device, wherein the advertisement alternative placement configuration information includes one or more alternative images selected by a user at the client computing device, and wherein the advertisement alternative placement configuration information includes preferences associated with the placement of the alternative images in network content requested by the user at the client computing device;
determining, by the network advertising management component, one or more advertisement alternative placement requests based on the advertisement alternative placement configuration information, where each of the one or more advertisement alternative placement requests is associated with at least one of the one or more alternative images and at least one financial value associated with a maximum that the user is willing to pay to substitute the at least one of the one or more alternative images for one or more advertisements in content at the client computing device; and
providing, by the network advertising management component, the one or more advertisement alternative placement requests to an advertisement placement provider, wherein the advertisement alternative placement requests are processed by the advertisement placement provider to cause content displayed at the client computing device to include one or more of the one or more alternative images based on the at least one financial value associated with each of the one or more advertisement alternative placement requests, wherein the displayed content includes one or more advertisement placement slots for the display of advertisements, and wherein the included one or more of the one or more alternative images are displayed in the one or more advertisement placement slots of the displayed content at the client computing device.

2. The method of claim 1, wherein the displayed content is a Web page.

3. The method of claim 1, wherein the advertisement placement provider provides the displayed content to the client computing device.

4. The method of claim 1, wherein the advertisement placement slots of the displayed content correspond to network identifiers associated with the advertisement placement provider.

5. The method of claim 4, wherein the advertisement placement provider is configured to provide the client computing device with the included one or more of the one or more alternative images based on the network identifiers associated with the advertisement placement provider.

6. The method of claim 1, wherein the advertisement alternative placement requests are processed by the advertisement placement provider to cause content displayed at the client computing device to include one or more of the one or more alternative images based on whether the at least one financial value associated with each of the one or more advertisement alternative placement requests exceeds a financial value associated with an advertisement placement.

7. A system for message placement management comprising:
    one or more computer processors; and
    at least one computer memory accessible by at least one of the one or more computer processors, the at least one computer memory storing an executable software module, wherein the at least one of the one or more computer processors is configured to execute the software module to provide one or more message placement requests associated with a client computing device to a message placement provider,
        wherein each of the one or more message placement requests are associated with one or more alternative messages and at least one financial value, the one or more alternative messages and the at least one financial value selected by a user of the client computing device, and
        wherein the message placement requests are processed by the message placement provider to cause a representation of content displayed at the client computing device to include at least one of the one or more alternative messages, selected by the user of the client computing device, based on the at least one financial value selected by the user of the client computing device.

8. The system of claim 7, wherein the message placement provider corresponds to at least one of a content provider and an advertisement placement provider.

9. The system of claim 7, wherein the one or more alternative messages include an image, a video clip, a text segment, or an animation.

10. The system of claim 7, wherein the representation of content displayed at the client computing device includes one or more message placement slots.

11. The system of claim 10, wherein at least one of the alternative messages is displayed in at least one of the one or more message placement slots at the client computing device.

12. The system of claim 10, wherein at least one of the alternative messages is displayed in all the one or more message placement slots at the client computing device.

13. The system of claim 11, wherein the one or more message placement slots comprise advertisement placement slots for the placement of advertising.

14. The system of claim 7, wherein the message management component is further operable to generate the message placement requests based on message placement configuration information obtained from the client computing device.

15. The system of claim 7, wherein the message management component is further operable to provide the representation of content displayed at the client computing device to the client computing device in response to a content request.

16. The system of claim 15, wherein the message management component is further operable to generate the message placement requests based at least in part on the content request.

17. The system of claim 7, wherein the financial value is associated with a value of placing a message in network content.

18. The system of claim 17, wherein the representation of content displayed at the client computing device is caused to include at least one of the one or more alternative messages if the at least one message placement value corresponds to a highest value bid for the placement of a message.

19. A computer-implemented method for message placement management comprising:
    as performed by a message component comprising one or more computing devices configured to execute specific instructions,
    determining one or more message placement requests based on message placement configuration information associated with a client computing device, wherein each of the one or more message placement requests is associated with at least alternate message information and at least one financial value selected by a user of the client computing device; and
    providing the one or more message placement requests to a message placement provider, wherein the message placement requests are processed by the message placement provider to cause a representation of content displayed at the client computing device to include one or more alternative messages associated with the alternate message information based on the financial value selected by the user of the client computing device.

20. The computer-implemented method of claim 19, wherein the one or more alternative messages include at least one of an image, a video clip, a text segment, and an animation.

21. The computer-implemented method of claim 19, wherein the representation of content displayed at the client computing device includes one or more message placement slots.

22. The computer-implemented method of claim 21, wherein at least one of the alternative messages is displayed in at least one of the one or more message placement slots at the client computing device.

23. The computer-implemented method of claim 21, wherein at least one of the alternative messages is displayed in all the one or more message placement slots at the client computing device.

24. The computer-implemented method of claim 22, wherein the one or more message placement slots comprise advertisement placement slots for the placement of advertising.

25. The computer-implemented method of claim 19, wherein the message placement configuration information is obtained from the client computing device.

26. The computer-implemented method of claim 19 further comprising providing the representation of content displayed at the client computing device to the client computing device in response to a content request.

27. The computer-implemented method of claim 26 further comprising determining the message placement requests based at least in part on the content request.

28. The computer-implemented method of claim 19, wherein the financial value is associated with a value of placing a message in network content.

29. The computer-implemented method of claim 28, wherein the representation of content displayed at the client computing device is caused to include at least one of the one or more alternative messages if the at least one message placement value corresponds to a highest value bid for the placement of a message.

\* \* \* \* \*

UNITED STATES PATENT AND TRADEMARK OFFICE
CERTIFICATE OF CORRECTION

| | | |
|---|---|---|
| PATENT NO. | : 8,615,431 B1 | Page 1 of 1 |
| APPLICATION NO. | : 13/249047 | |
| DATED | : December 24, 2013 | |
| INVENTOR(S) | : Bell et al. | |

It is certified that error appears in the above-identified patent and that said Letters Patent is hereby corrected as shown below:

In the Specification

In column 25 at line 49, Change "above" to --above.--.

In the Claims

In column 40 at line 21, In Claim 1, after "by" insert --a network--.

In column 42 at line 17, In Claim 19, after "message" insert --management--.

Signed and Sealed this
Second Day of December, 2014

Michelle K. Lee
*Deputy Director of the United States Patent and Trademark Office*